(12) United States Patent
McKeon

(10) Patent No.: US 9,765,536 B2
(45) Date of Patent: Sep. 19, 2017

(54) LOAD CARRYING PLATFORM SHUTTLE

(71) Applicant: GUMBOOTS NOMINEES PTY LIMITED, Alexandria, New South Wales (AU)

(72) Inventor: Allan Sydney McKeon, Seven Hills (AU)

(73) Assignee: Gumboots Nominees Pty Limited, Alexandria (AU)

( * ) Notice: Subject to any disclaimer, the term of this patent is extended or adjusted under 35 U.S.C. 154(b) by 58 days.

(21) Appl. No.: 14/413,401

(22) PCT Filed: Jul. 9, 2013

(86) PCT No.: PCT/AU2013/000749
§ 371 (c)(1),
(2) Date: Jan. 7, 2015

(87) PCT Pub. No.: WO2014/008532
PCT Pub. Date: Jan. 16, 2014

(65) Prior Publication Data
US 2015/0152656 A1    Jun. 4, 2015

(30) Foreign Application Priority Data
Jul. 9, 2012 (AU) ................... 2012902923

(51) Int. Cl.
*E04G 3/28* (2006.01)
*E04G 3/18* (2006.01)
(Continued)

(52) U.S. Cl.
CPC ............... *E04G 3/18* (2013.01); *E04G 3/28* (2013.01); *E04G 21/166* (2013.01);
(Continued)

(58) Field of Classification Search
USPC ......... 104/242, 48, 50; 114/230.17; 14/69.5, 14/71.1; 182/113, 186.6, 223, 36, 82;
(Continued)

(56) References Cited

U.S. PATENT DOCUMENTS 4,444,289 A   4/1984 Jungman
5,845,356 A * 12/1998 Kielinski ............... B65G 69/30
                                                  14/69.5
(Continued)

FOREIGN PATENT DOCUMENTS

AU   WO 9506794 A1 * 3/1995 ............... E04G 3/18
AU      2010201726 A1    11/2010
(Continued)

OTHER PUBLICATIONS

New Zealand First Examination Report for IP No. 628050 dated Jun. 10, 2015 in 2 pages.
(Continued)

*Primary Examiner* — Gregory Adams
(74) *Attorney, Agent, or Firm* — Procopio Cory Hargreaves and Savitch LLP; Stephen Beuerle

(57) ABSTRACT

A load carrying platform shuttle (10) has a static frame (12) and a movable carriage (14). The frame is securable to a mounting location, such as a given working level of a multi-storey building under construction, and the carriage is arranged to telescope into the static frame between an extended position outboard of the mounting location and a retracted position inboard of the mounting location. The movable carriage can move between the extended position and the retracted position while carrying a load. The shuttle includes a motor (76) and gear assembly (72, 74, 78) for driving the movement of the carriage between the extended position and the retracted position while carrying the load.

10 Claims, 22 Drawing Sheets

(51) Int. Cl.
    *E04G 21/16*    (2006.01)
    *F16M 11/04*    (2006.01)
    *F16M 11/18*    (2006.01)
    *E04G 5/00*     (2006.01)
(52) U.S. Cl.
    CPC ........... *F16M 11/048* (2013.01); *F16M 11/18* (2013.01); *E04G 5/001* (2013.01)
(58) Field of Classification Search
    USPC ................ 248/429, 430; 414/537, 540, 921; 52/749.1
    See application file for complete search history.

(56)         References Cited

U.S. PATENT DOCUMENTS 7,815,014 B2 * 10/2010 Preston ..................... E04G 3/28
                                                         182/223
    2009/0020362 A1   1/2009 Diaz
    2010/0005998 A1 * 1/2010 Kempf ..................... B66C 9/02
                                                         105/150

FOREIGN PATENT DOCUMENTS

| EP | 0419250 A2 | 3/1991 | |
| ES | WO 2008155434 A1 * | 12/2008 | ............. E04G 21/16 |
| GB | 2411390 A * | 8/2005 | ............. E04H 6/245 |
| JP | 2009-209535 A | 9/2009 | |
| NZ | 501297 | 10/2000 | |
| WO | 2005012672 A1 | 2/2005 | |
| WO | 2007092999 A1 | 8/2007 | |
| WO | 2014008532 A1 | 1/2014 | |

OTHER PUBLICATIONS

Extended European Search Report for European Patent Application No. 13816483.5 in 11 pages.
International Search Report for PCT/AU2013/000749, dated Sep. 18, 2013, in 5 pages.
International Preliminary Report on Patentability for PCT/AU2013/000749, dated Jul. 17, 2014, in 22 pages.

* cited by examiner

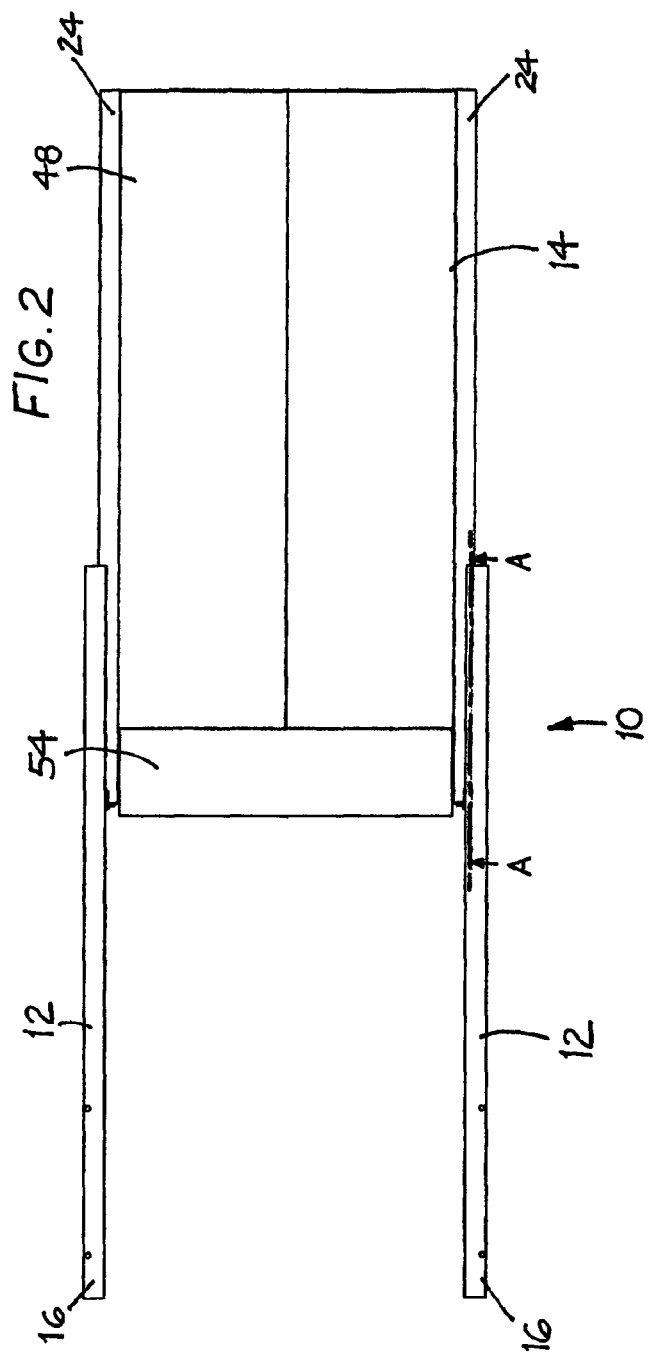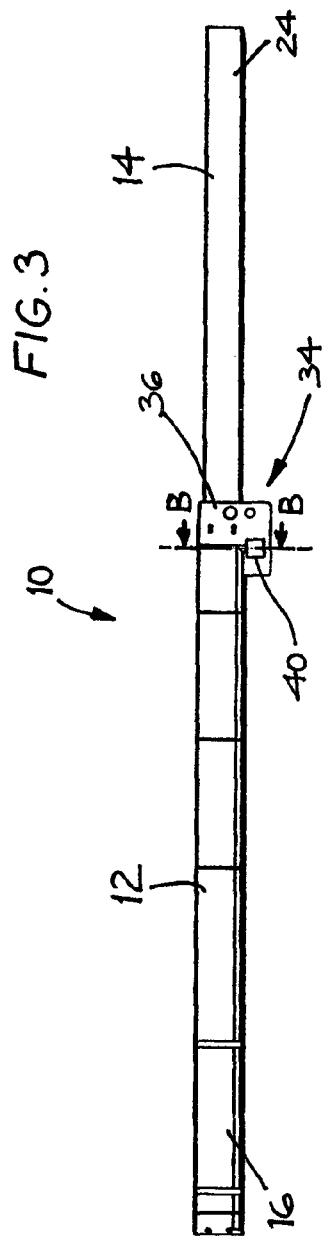

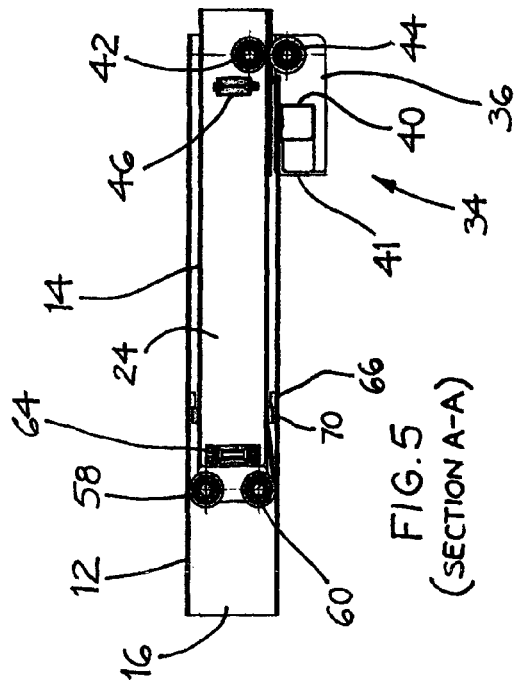
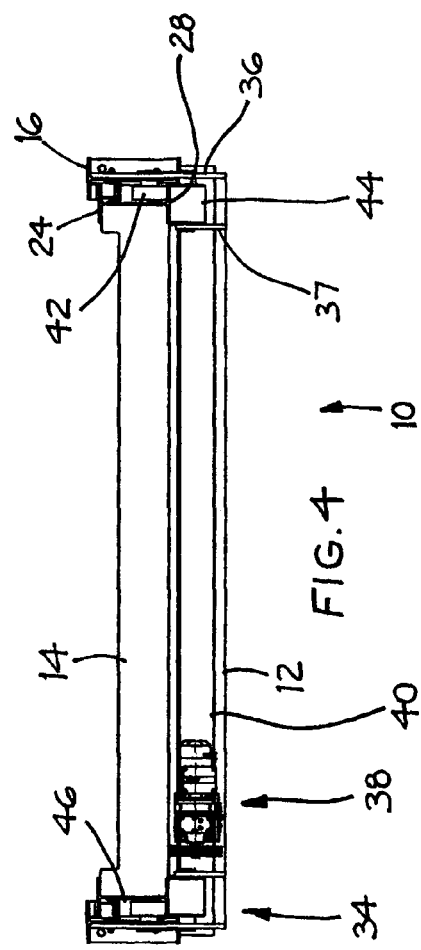
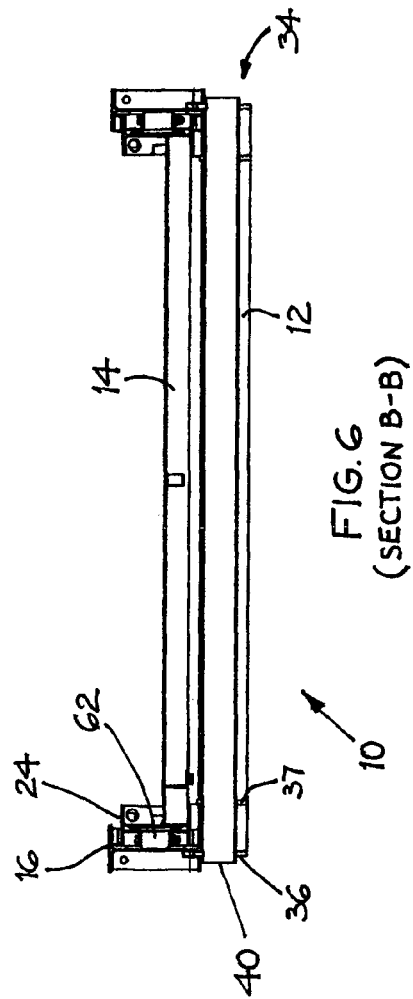
FIG. 5 (SECTION A-A)
FIG. 6 (SECTION B-B)
FIG. 4

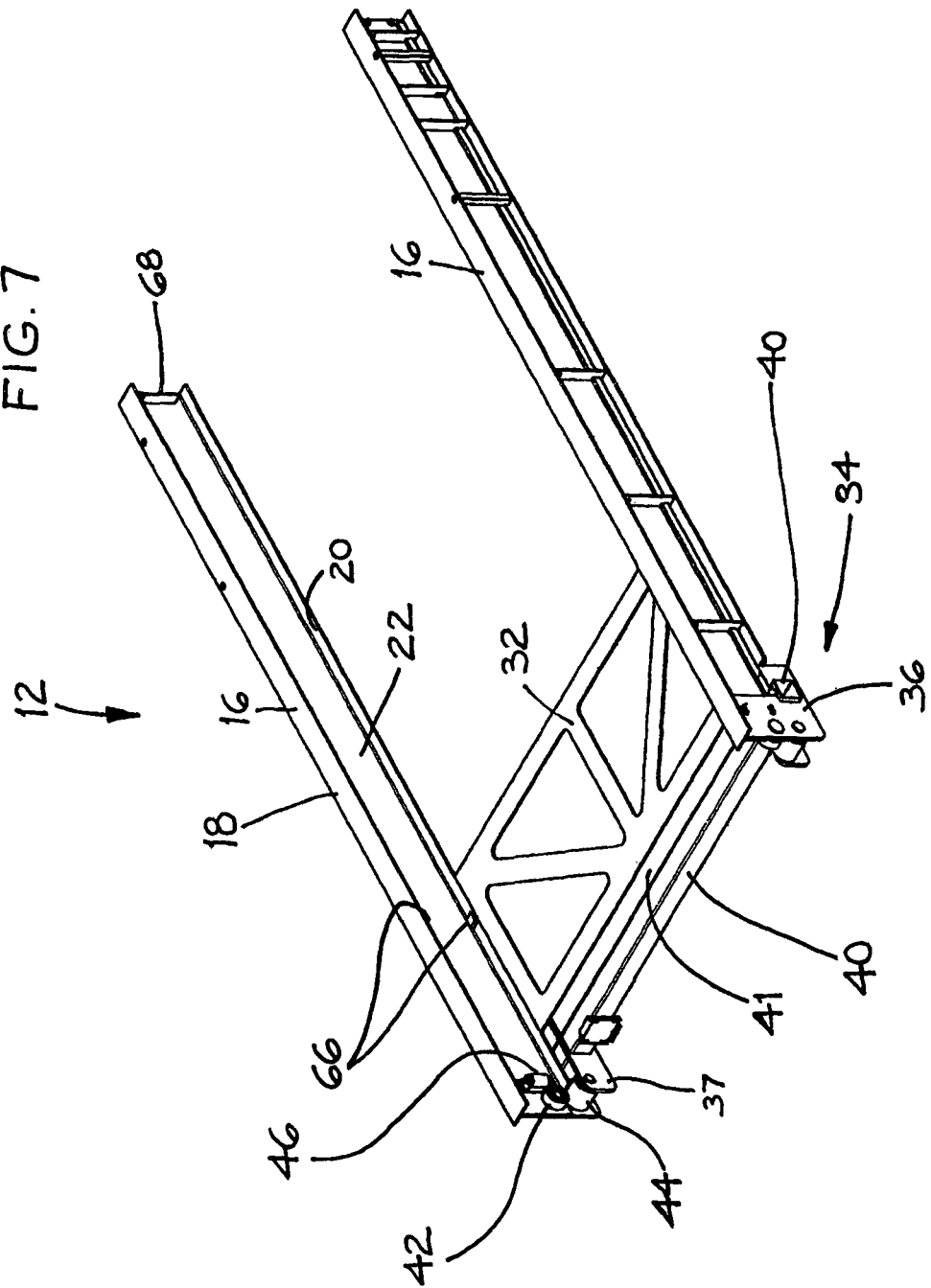

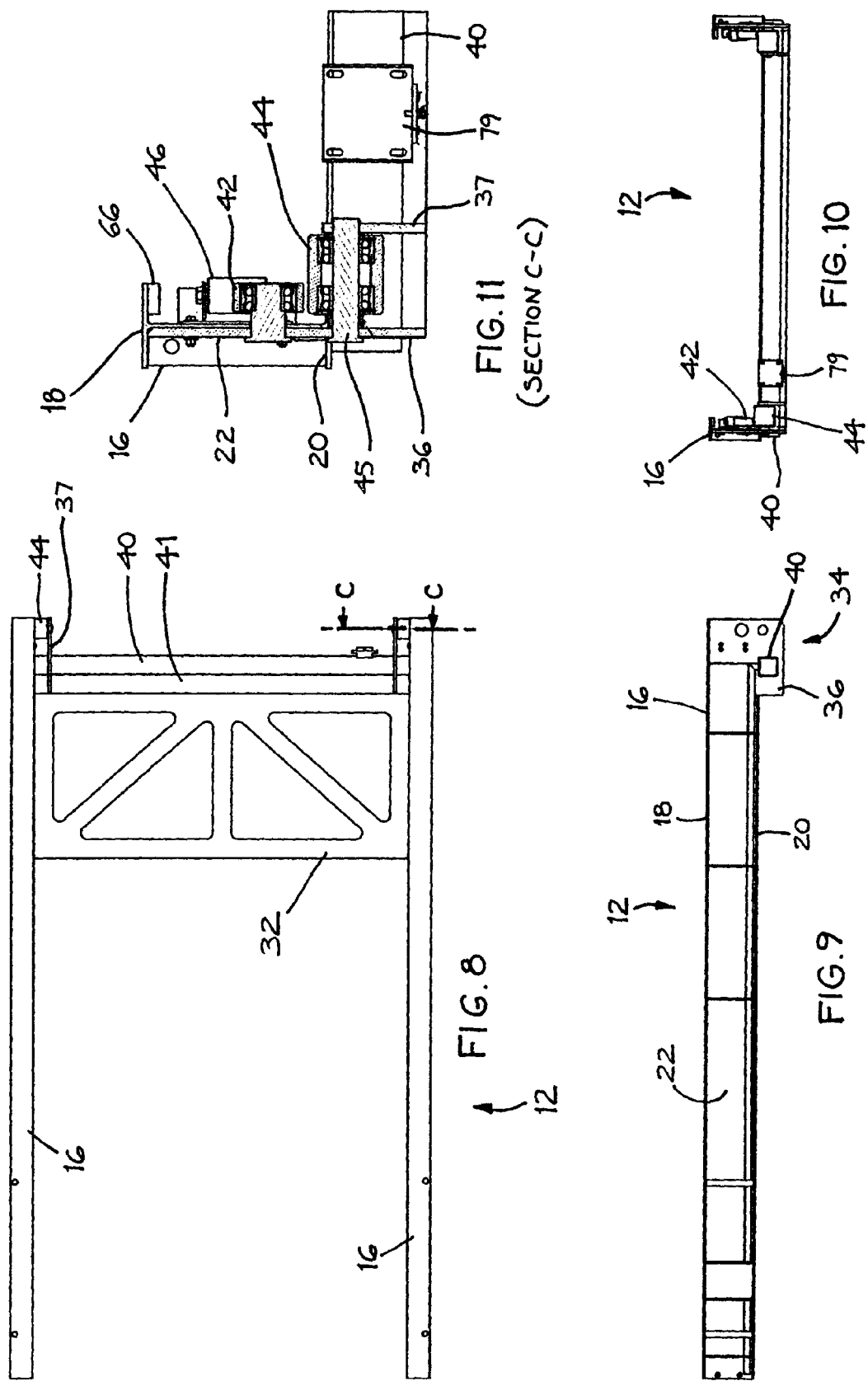

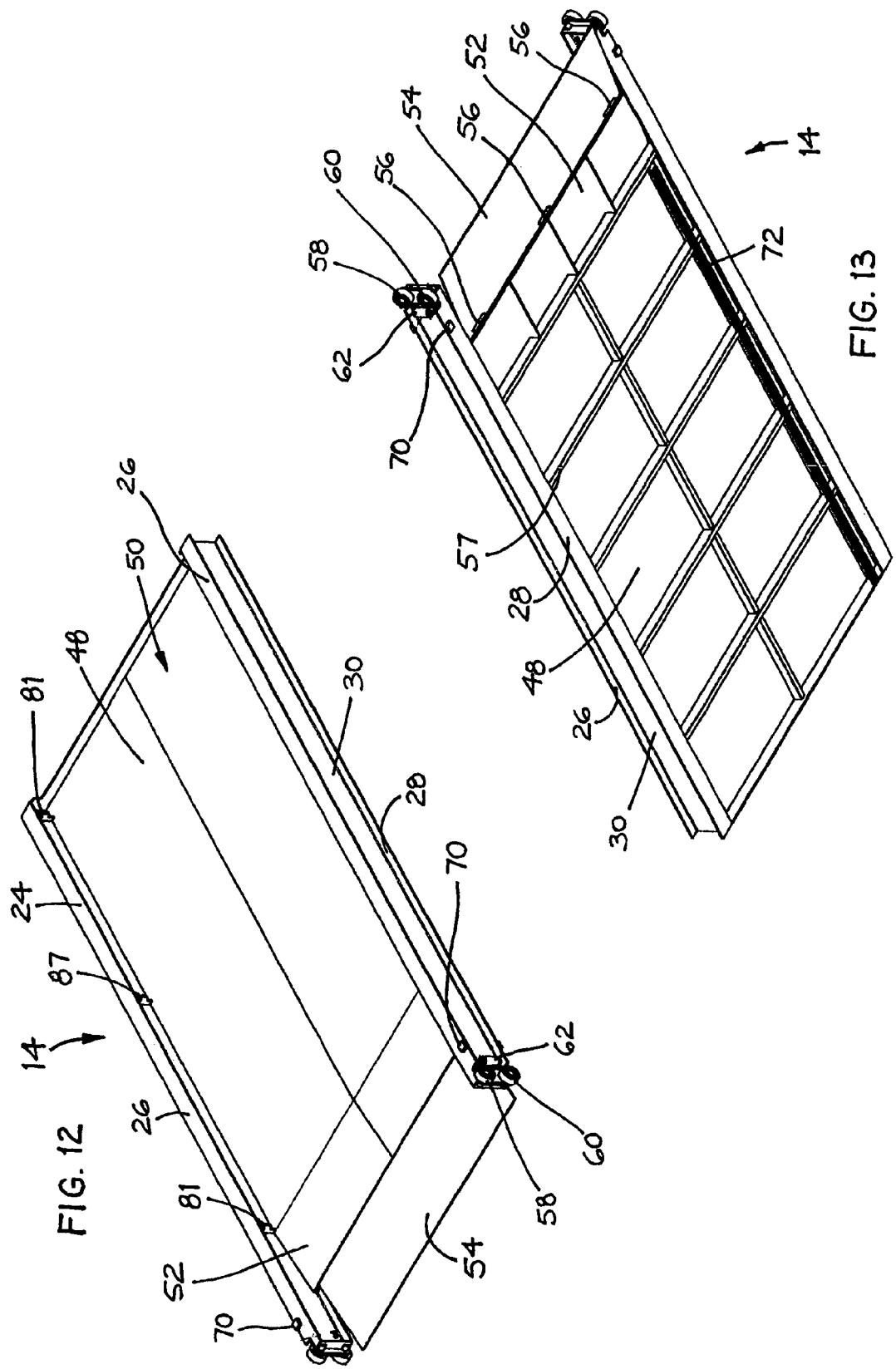

LOAD CARRYING PLATFORM SHUTTLE

FIELD OF THE INVENTION

The present invention relates to a load carrying platform shuttle for use in a variety of commercial load carrying applications, such as in the construction of multi-storey buildings, in the warehousing industry and in the transport industry, where temporary or permanent use is required. The present invention also relates to a load carrying platform shuttle that embodies certain improvements over movable work platforms of the prior art.

BACKGROUND

Movable work platforms (also known as loading platforms, transportation platforms or construction platforms) are commonly used in multi-storey construction sites for the loading and unloading of building and other materials to and from a given working level of the building under construction. Such work platforms are secured within the building and can move between a retracted configuration and an extended configuration. In the extended configuration, the platform protrudes from the building and acts as a loading deck for crane loads to be loaded onto, and unloaded from, the platform.

A typical prior art construction platform requires the load to be removed from the deck when in its outboard position before the deck can be safely moved to its inboard position. The lengthy time it takes to unload the deck, and its prolonged position outboard of the building under construction, means that other loading operations, including use of the crane for loading materials onto other levels, are restricted. Crane hire is a major cost in multi-storey construction sites.

It is another shortcoming of many of the same and other prior art movable work platforms that, when the deck is fully extended such that a loading region for accepting the crane load protrudes beyond the perimeter of the multi-storey building, the furthermost end of the loading region tilts a significant distance below an ideal horizontal position. When these prior art decks are not under load, there may commonly be a deflection of about 10 mm from horizontal, but under load this deflection becomes even more pronounced to the point where it may present a danger to the safe operation of the work platform and to workers. Deflections of the deck of about 30 mm from the horizontal are commonly experienced by such prior art work platforms when the deck is supporting loads of about 5 tonnes.

It is an object of the present invention to overcome, or at least substantially ameliorate, these and other shortcomings of the prior art, or at least provide a useful alternative.

SUMMARY OF THE INVENTION

According to a first aspect of the present invention, there is provided a load carrying platform shuttle comprising a static frame securable to at least one slab without the static frame being supported by a structure that is separate from the at least one slab and a carriage arranged to telescope into the static frame between an extended position outboard of the at least one slab and a retracted position inboard of the at least one slab, wherein the carriage can move between the extended position and the retracted position while carrying a load.

According to a second aspect of the invention there is provided a load carrying platform shuttle comprising a static frame securable to at least one slab and a carriage arranged to telescope into the static frame between an extended position outboard of the at least one slab and a retracted position inboard of the at least one slab, wherein the carriage can move between the extended position and the retracted position while carrying a load and wherein support provided by securement of the static frame to the at least one slab is sufficient to support the load carrying platform shuttle during movement of the carriage between the extended position and the retracted position whilst carrying a load.

Preferably, the shuttle includes a motor and gear assembly for driving the movement of the carriage between the extended position and the retracted position while carrying a load.

In a preferred form, the shuttle includes a pair of load bearing, lower support rollers connected to an outboard end of the frame, each lower support roller supporting the carriage at respective opposite sides thereof.

It is preferred that each lower support roller supports an underside of a flange of a side beam at a respective side of the carriage.

The side beam is preferably an I-beam which has a lower flange and an upper flange interconnected by a vertical web portion, and the lower support roller supports the underside of the lower flange.

The shuttle also preferably includes a pair of upper support rollers connected to an outboard end of the frame, each upper support roller cooperating with a respective lower support roller to pinch and hold therebetween a flange of the side beam.

Preferably, the shuttle includes a pair of guide rollers connected to an outboard end of the frame, each guide roller engaging against an outer facing side of the vertical web portion of an I-beam of the carriage at respective opposite sides thereof.

According to a third aspect of the present invention, there is provided a method of using a load carrying platform shuttle to carry a load between outboard and inboard positions of at least one slab, comprising the steps of: securing a frame of the shuttle to the at least one slab without the frame being supported by a structure that is separate from the at least one slab; extending a carriage of the shuttle into an extended position outboard of the at least one slab; receiving a load on the shuttle while in the extended position; retracting the carriage into a retracted position inboard of the at least one slab to carry the load to the inboard position.

According to another aspect of the invention there is provided a method of using a load carrying platform shuttle to carry a load between outboard and inboard positions of at least one slab, comprising the steps of: securing a frame of the shuttle to the at least one slab such that support provided by securement of the frame to the at least one slab is sufficient to support the load carrying platform shuttle during movement of the carriage between an extended position and a retracted position whilst carrying a load; extending a carriage of the shuttle into the extended position outboard of the at least one slab; receiving a load on the shuttle while in the extended position; and retracting the carriage into the retracted position inboard of the at least one slab to carry the load to the inboard position.

In a preferred application of the method, the load carrying platform shuttle is used to carry loads between outboard and inboard positions of a multi-storey building.

SUMMARY OF THE DRAWINGS

Various embodiments of the invention will now be described by way of example only, with reference to the accompanying drawings, in which:

FIG. 2 is a top view of the shuttle as shown in FIG. 1;

FIG. 3 is a side view of the shuttle as shown in FIG. 1;

FIG. 4 is an outboard end view of the shuttle as shown in FIG. 1;

FIG. 5 is a sectional view through A-A of the shuttle as shown in FIG. 2;

FIG. 6 is a sectional view through B-B of the shuttle as shown in FIG. 3;

FIG. 7 is a perspective view of the static frame of the shuttle of FIGS. 1 to 6;

FIG. 8 is a top view of the static frame as shown in FIG. 7;

FIG. 9 is a side view of the static frame as shown in FIG. 7;

FIG. 10 is an outboard end view of the static frame as shown in FIG. 7;

FIG. 11 is a sectional view through C-C of the static frame as shown in FIG. 8;

FIG. 12 is a perspective view from the top of the movable carriage of the shuttle of FIGS. 1 to 6;

FIG. 13 is a perspective view from the bottom of the movable carriage of the shuttle of FIGS. 1 to 6;

DETAILED DESCRIPTION

Figure 1:
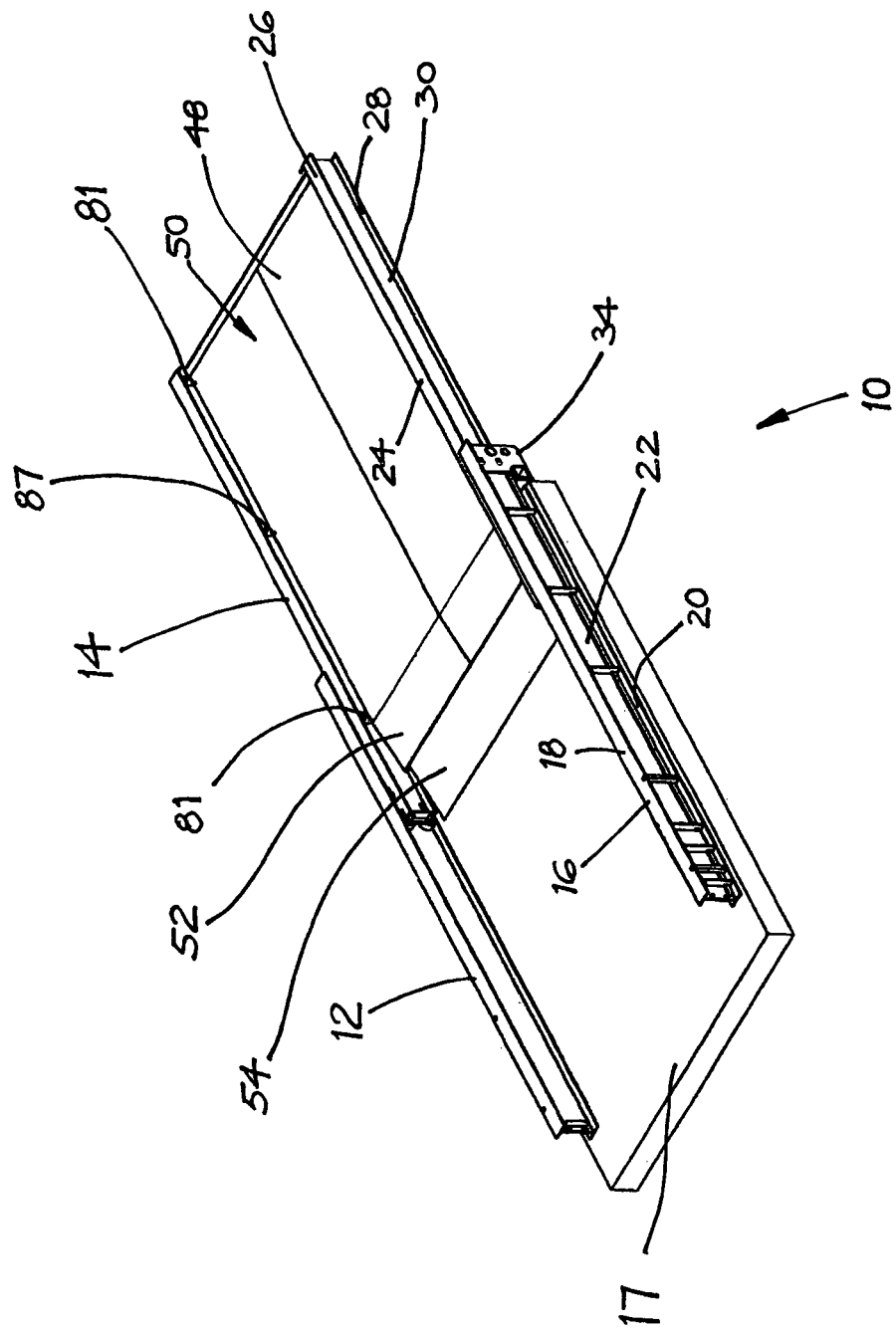
FIG. 1 is a perspective view of a load carrying platform shuttle according to a preferred embodiment of the invention, with the movable carriage of the shuttle being in the extended position.

In the embodiments described below, like reference numerals refer to like features or components. Also, in some instances where there is a plurality of similar features or components positioned symmetrically, only some of the features or components may be labelled in the drawing figures. The embodiments are described in the context of the construction of multi-storey buildings, but the present invention is equally applicable to the transport industry or to the warehousing industry where heavy loads need to be moved into and out of a building.

Figure 14:
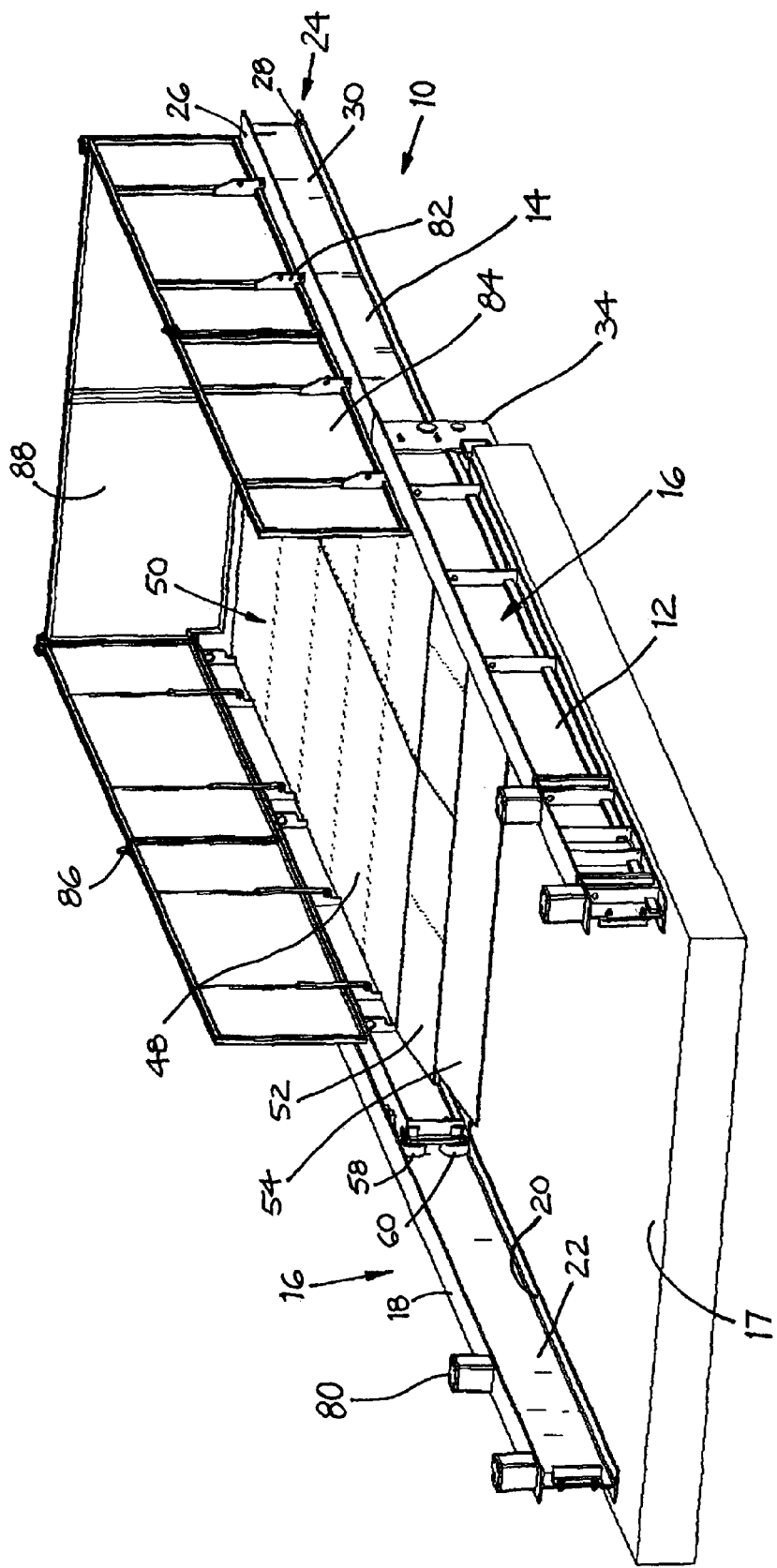
FIG. 14 is a perspective view of the load carrying platform shuttle of FIGS. 1 to 13 in an operational form, with the movable carriage of the shuttle being in the extended position, and with side guard rails and end guard gates being in erect positions.
Figure 15:
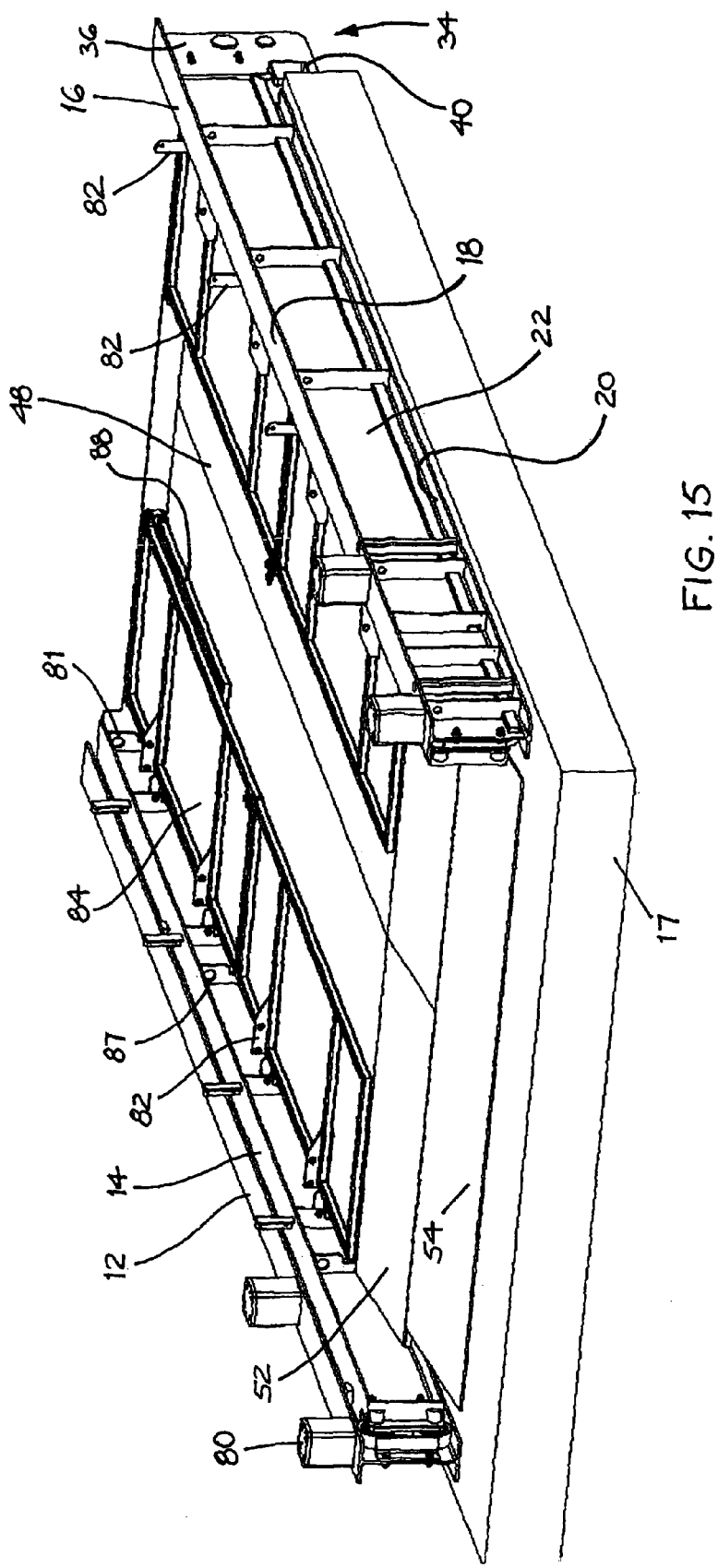
FIG. 15 is a perspective view of the shuttle of FIG. 14, with the movable carriage of the shuttle being in the retracted position, and with the side guard rails and the end guard gates being in collapsed positions.

With reference to the embodiment shown in FIGS. 1 to 18, a load carrying platform shuttle 10 is shown in an extended configuration in FIGS. 1 to 6 and 14, and is shown in a retracted configuration in FIG. 15. The load shuttle 10 has two main components: a static frame 12 and a movable carriage 14. FIGS. 7 to 11 show the frame 12 in isolation and FIGS. 12 and 13 show the carriage 14 in isolation. The carriage 14 is nested within the frame 12 and can telescope to allow the shuttle 10 to move between an extended configuration and a retracted configuration.

In use of the load carrying platform shuttle 10 to carry loads in a multi-storey building, when the carriage 14 is in its extended position it protrudes out of the building in an outboard position such that a load can be placed on the carriage 14 by a crane. Moving the carriage 14 to its retracted position inboard of the building allows other crane movements to occur without interference from the protruding carriage 14. The embodiment shown is designed to carry a six tonne load between the extended and retracted positions.

As shown in FIGS. 7 to 11, the load shuttle frame 12 is constructed from a pair of steel side I-beams 16 fixed together in parallel arrangement and mounted on a concrete slab 17 or other mounting location. Each I-beam 16 has an upper flange 18 and a lower flange 20 interconnected by a vertical web portion 22, and this defines (for each I-beam 16 of the frame 12) a pair of vertically spaced apart, outer facing flange portions and a pair of vertically spaced apart, inner facing flange portions.

As shown in FIGS. 12 and 13, the load shuttle carriage 14 is also constructed from a pair of steel side I-beams 24 fixed together in parallel arrangement. Each I-beam 24 has an upper flange 26 and a lower flange 28 interconnected by a vertical web portion 30, and this defines (for each I-beam 24 of the carriage 14) a pair of vertically spaced apart, outer facing flange portions and a pair of vertically spaced apart, inner facing flange portions.

When the shuttle 10 is assembled, the outer facing flange portions of the side I-beams 24 of the carriage 14 nest within the inner facing flange portions of the side I-beams 16 of the frame 12. This limits the shuttle carriage 14 from tilting out of the shuttle frame 12.

In an alternative form, the I-beams 16, 24 may be replaced by parallel flange channels ("PFC's"), with the frame having a pair of steel side PFC's in which the channel faces inwardly, and with the carriage having a pair of steel side PFC's in which the channel faces outwardly and is nested within the inwardly facing channel of the frame. Other forms of beams may also be used, such as square channels and C-beams.

As shown in FIGS. 7 to 9, the side I-beams 16 of the load shuttle frame 12 are fixed with respect to each other by a set of frame cross braces 32. The frame cross braces 32 are set back from an outboard end of the frame 12 and limit the I-beams 16 of the frame 12 from moving apart.

As also shown in FIGS. 1, 3 to 6, 10, 11, 16 and 17, at the outboard end of the frame 12 is a bulk head 34 (or frame nose portion) which includes a pair of opposed outer nose plates 36, an inner nose bracket plate 37 adjacent each outer nose plate 36, a motor and gearing assembly 38, a strengthening square section cross-beam 40 (or nose cross brace), a strengthening L-section cross-beam 41 (forming an "inverted L" when assembled), and an arrangement of support and guide rollers. The bulk head 34 houses these major load carrying components.

Attached to each nose plate 36 is an upper, frame mounted, carriage support roller 42 and a lower, frame mounted, carriage support roller 44 (or load bearing tyre), both support rollers 42, 44 being able to rotate about their horizontal axes. The lower support roller 44 is also attached, via its wide diameter rotating axle 45 and bearings (see especially FIG. 11), to the inner nose bracket plate 37. As shown in FIGS. 4, 5, 16 and 17, the upper support roller 42 and the lower support roller 44, in use, act as pinch rollers holding therebetween the outer facing flange portion of the lower flange 28 of the carriage side I-beams 24. The lower support roller 44 is wider than the upper support roller 42 and supports substantially the full width of the underside of the lower flange of each of the carriage side I-beams 24 (i.e. the roller 44 is "fully flanged"), thereby allowing the load to be distributed across a wider surface area such that the pair of "fully flanged" rollers 44 are able to carry or bear most of the load in the carriage 14. This load is significantly increased when the carriage 14 is in the extended position, and particularly when a substantial crane load has been received thereon. The use of such a lower, frame mounted, carriage support roller 44 in the telescoping movement of the carriage 14 into and out of the frame contributes significantly to allowing the shuttle 10 to carry a substantial crane load between the outboard and inboard positions at a given working level of a multi-storey building. The square section cross-beam 40 and the L-section cross-beam 41 brace the lower support roller 44 to further increase its load carrying capacity. Also, the upper and lower, frame mounted, carriage support rollers 42 and 44 contribute to limiting the vertical movement of the carriage 14 at the outboard end of the frame 12 by virtue of their pinching action on the lower flange 28 of the carriage side I-beam 24. This limits the outboard end of the carriage 14, when in its extended position, from deflecting or tilting dangerously before, and especially after, it has received a substantial crane load.

Also attached to each nose plate 36 is a frame mounted, carriage guide roller 46 able to rotate about its vertical axis. The pair of opposing guide rollers 46 on the respective opposing nose plates 36 press firmly against and hold the outer facing sides of vertical web portions 30 of the carriage side I-beams 24. The opposing frame mounted, carriage guide rollers 46 contribute to limiting the horizontal movement of the carriage 14 at the outboard end of the frame 12.

As shown in FIGS. 1, 2 and 12 to 15, the carriage 14 has a carriage floor plate 48 (or carriage floor area) having a horizontal load receiving area 50 which transitions to a sloping ramp area 52 at an inboard end of the carriage 14. A floating ramp 54 is hinged (see hinges 56 in FIG. 13) to an edge of the sloping ramp area 52. In use, an inboard free edge of the floating ramp 54 abuts the concrete slab 17 or other surface of a mounting location on which the frame 12 is secured. The sloping ramp area 52 and floating ramp 54 make it easier to roll or slide loads on and off the horizontal load receiving area 50 of the carriage floor plate 48. There is a load distributing and reinforcing frame structure 57 on the underside of the carriage floor plate 48 as shown in FIG. 13.

As shown in FIGS. 5, 12, 13 and 18, the carriage 14 has an upper, carriage mounted, carriage support roller 58 and a lower, carriage mounted, carriage support roller 60 attached at the inboard end of each of the carriage side I-beams 24, both support rollers 58, 60 being able to rotate about their horizontal axes. The upper support roller 58 engages with the lower side of the inner facing portion of the upper flange 18 of the frame side I-beam 16 and the lower support roller 60 engages with the upper side of the inner facing portion of the lower flange 20 of the frame I-side beam 16. The opposing pairs of upper and lower, carriage mounted, carriage support rollers 58, 60 contribute to limiting the vertical movement of the carriage 14 at the inboard end of the frame 12.

Figure 18:
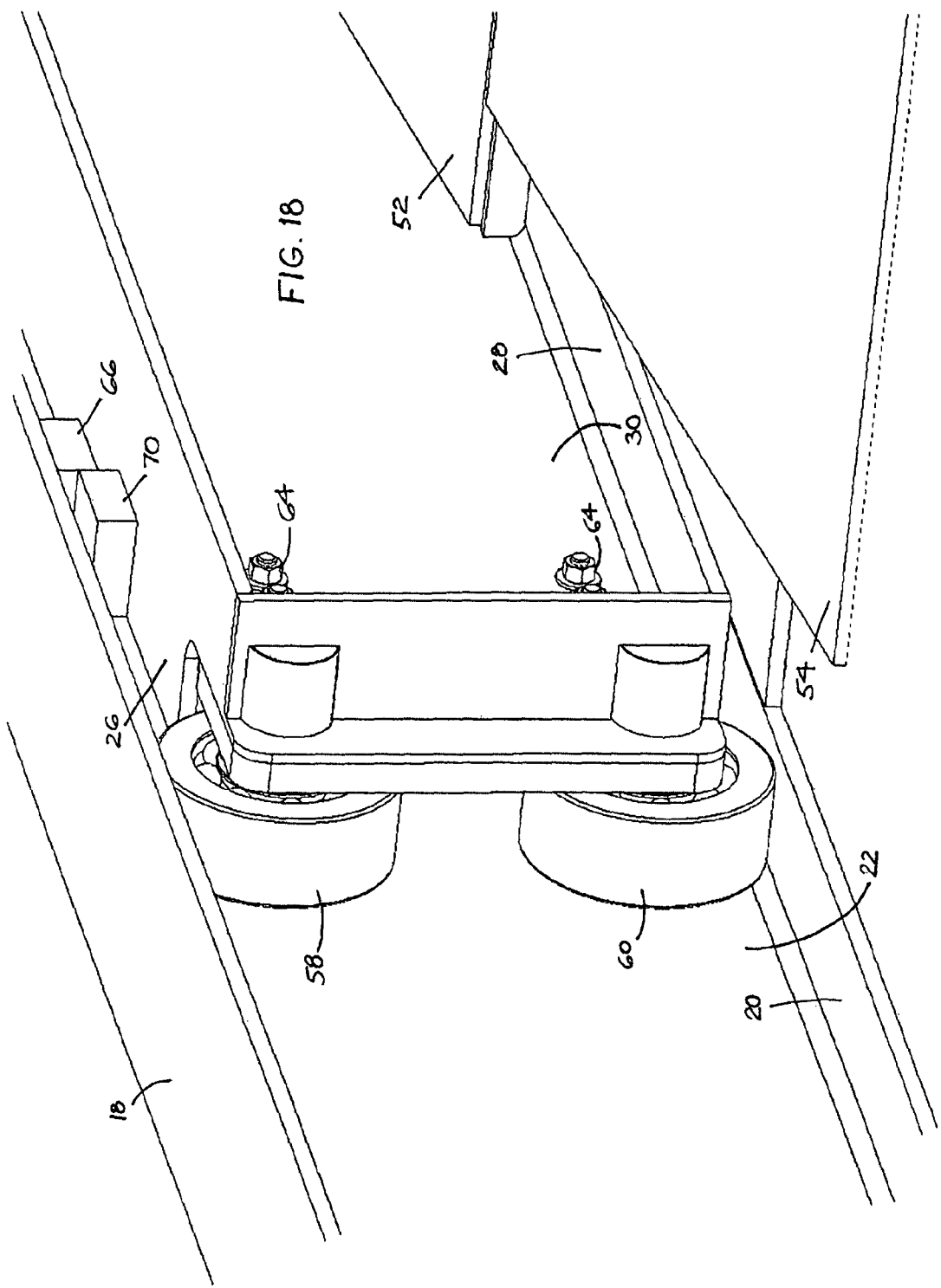
FIG. 18 is an enlarged perspective view of a part of an inboard end of the movable carriage and an engaging part of the static frame of the shuttle of FIGS. 14 and 15.

Also attached at the inboard end of each of the carriage side I-beams 24 is a carriage mounted, carriage guide roller 62 (see the nuts 64 for attachment of the bracket for the roller 62 in FIG. 18), the guide roller 62 being able to rotate about its vertical axis. Each guide roller 62 is attached to the outer facing surface of vertical web portion 30 of the carriage side I-beam 24. The opposing carriage guide rollers 62 on the carriage side I-beams 24 engage with a respective inner facing side of vertical web portion 22 of the frame side I-beam 16, and this contributes to limiting the horizontal movement of the inboard end of the carriage.

The extent of movement between the extended configuration and the retracted configuration (as best shown by comparison of FIGS. 14 and 15) of the load carrying platform shuttle 10 is governed by travel stops.

As shown in FIGS. 5, 7, 11 and 18, the frame 12 has a pair of frame mounted, carriage extension travel stops 66 and a frame mounted, carriage retraction travel stop 68 on each frame side I-beam 16. The carriage extension travel stops 66 are attached to the upper and lower sides of the inner facing portions of the upper and lower flanges 18, 20 of each frame side I-beam 16. The travel stops 66 are proximate to the outboard end of the frame 12 and adjacent to where the frame cross braces 32 interconnect the I-beams 16.

As shown in FIGS. 5, 12, 13 and 18, the carriage 14 has a pair of carriage mounted, carriage extension travel stops 70 on each carriage side I-beam 24. The carriage extension travel stops 70 are attached to the lower and upper sides of the outer facing portions of the lower and upper flanges 28, 26 of each carriage side I-beam 24. The travel stops 70 are proximate to the inboard end of the carriage 14.

As best shown in FIGS. 5 and 18, the extent of the carriage 14 moving telescopically to its extended position from the frame 12 is limited by the carriage mounted, carriage extension travel stops 70 abutting their corresponding frame mounted, carriage extension travel stops 66.

As best shown in FIG. 15, the extent of the carriage 14 moving telescopically to its retracted position to the frame 12 is limited by the inboard end of each carriage side I-beam 24 abutting a respective carriage retraction travel stop 68 (or rear bump stop) on each frame side I-beam 16.

The movement between the extended configuration and the retracted configuration of the shuttle 10 can be driven by means of a motor or a hand operated mechanism.

Figure 16:
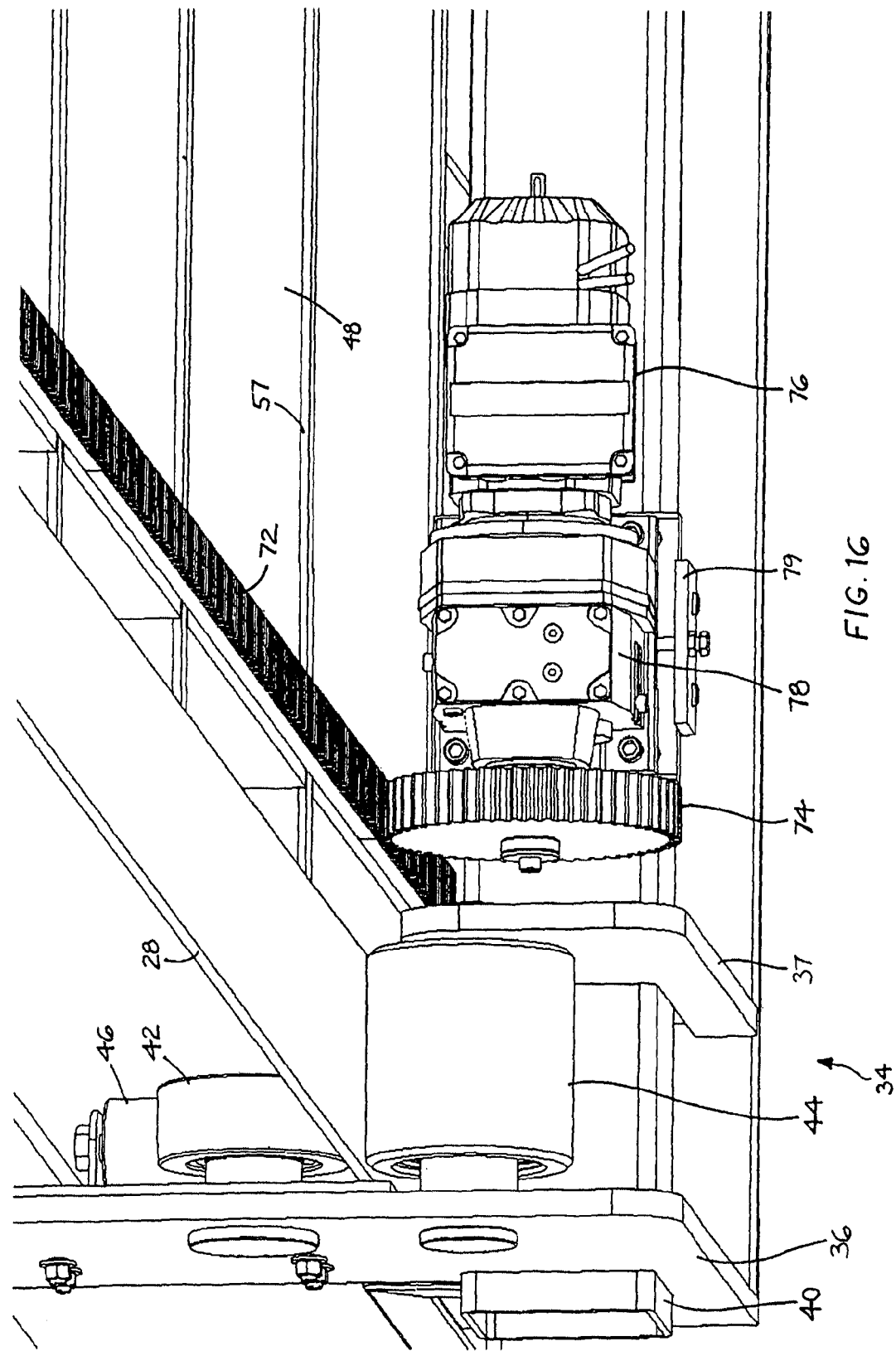
FIG. 16 is an enlarged perspective view from the bottom of a part of an outboard end of the static frame and an engaging part of the movable carriage of the shuttle of FIGS. 14 and 15.
Figure 17:
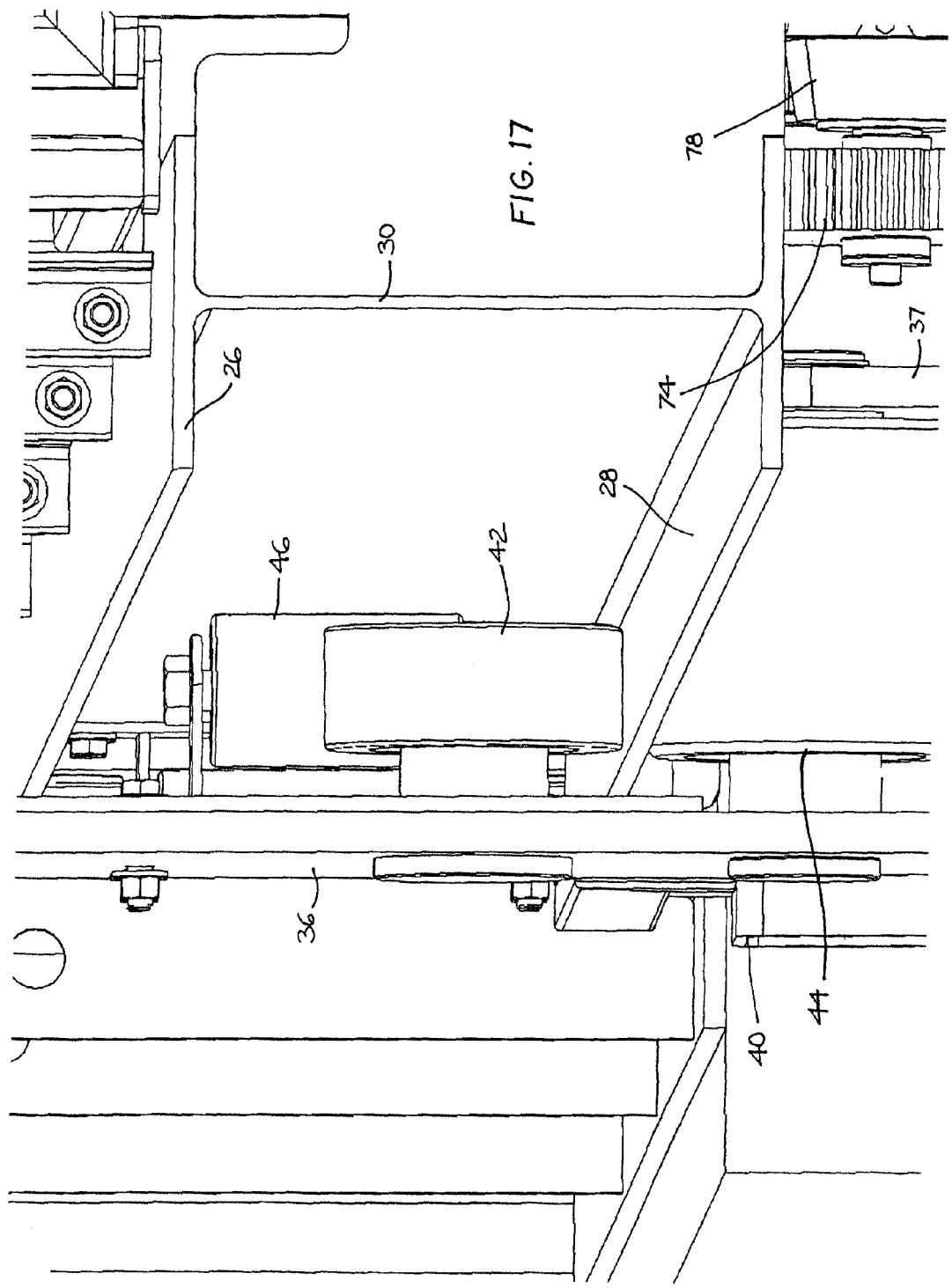
FIG. 17 is an enlarged perspective view from the top of the interengaging parts of the shuttle as shown in FIG. 16.

As shown in FIGS. 4 and 16, in this embodiment the movement is generated by a rack and pinion drive mechanism powered by an electrical motor and gearing assembly 38. Secured alongside the lower flange 28 of one of the carriage side I-beams 24 is a rack 72 (see also FIG. 13) which extends along the length of the underside of the horizontal load receiving area 50 of the floor plate 48. The rack 72 is engaged by meshing of teeth on a pinion 74 (or spur gear). The pinion 74 is rotated, thereby moving the rack 72 and the carriage 14, in either of two possible directions by operation of a motor 76 and its gear box 78. Connected to the cross-beam 40 is a motor adjustment block 79. The motor 76 may be a DC or AC motor with, for example, a power rating of 600 Watts and gearing ratio of 100:1. The drive mechanism may have different gearing depending on the means of operation. A hand operated drive mechanism, for example, would have a significantly different gearing to that of an electrical motor drive mechanism.

In use, and in the context of the construction of a multi-storey building, the load carrying platform shuttle 10 is positioned in a retracted configuration on the upper surface of a floor or concrete floor slab 17 (as shown in FIG. 15) at a given working level of the building, with the bulk head 34 (or nose portion) of the frame 12 protruding away from the outboard edge of the slab 17 and projecting below the upper surface of the slab 17.

The frame 12 is secured to the concrete floor slab 17 in the building using conventional props which extend between the slab of a floor level above and frame stay mounts 80 (as shown in FIGS. 14 and 15) to brace the frame 12. Alternatively, the frame 12 is secured to the floor slab 17 using concrete ties or other suitable anchors for the frame 12.

The shuttle 10 including the frame 12 and the carriage 14 can, when required, be lifted as a unit by a crane using four crane mounts 81 on the frame 12.

As shown in FIGS. 14 and 15, the carriage 14 has eight guard rail brackets 82 attached to the carriage side I-beams 24 for supporting guard rails 84 that project perpendicularly in erect positions from the carriage floor plate 48. The guard rails 84 extend down the length of each carriage side I-beam 24 from the outboard facing end thereof to the inboard end of the horizontal load receiving area 50, and can be pivoted downwardly and inwardly to collapsed positions flat on the carriage floor plate 48.

The guard rails 84 down each side of the carriage 14 are a pair of steel panels that are interconnected on their top edge with a bracket which also functions as a harness attachment point 86. This harness attachment point 86 provides a point to attach a safety harness that allows safe movement of a worker around the full area of the carriage floor plate 48. There is also a pair of harness attachment points 87 on opposite sides of the carriage floor plate 48 (as shown in FIGS. 1 and 12).

The outermost guard rails 84 support guard gates 88 that project perpendicularly in erect positions from the carriage floor plate 48 and extend across the outboard edge of the carriage floor plate 48, thus providing a closed position. The guard gates 88 can be pivoted between the closed position and an open position where they connect to the guard rails 84. The guard gates 88 prevent loads or workers accidentally falling from the carriage 14.

The shuttle 10 also includes a collision prevention sensor apparatus across the inboard end of the frame 12. The sensor apparatus utilizes a laser beam emitter and receiver to detect any interruption of the beam that is indicative of a person or other object entering a dangerous risk of collision zone at the inboard end of the frame 12 while the carriage 14 is being retracted to its inboard position. Interruption of the beam causes the motor 76 to immediately stop and the carriage 14 to become stationary, until the danger is removed, whereupon the operation of the shuttle can be resumed.

Operation of the shuttle 10 can involve a custom built, electrical control system located in a readily accessible housing connected to the shuttle. The power supply can be either DC or AC. The power supply can be provided by batteries or by AC of any voltage, but preferably low voltage.

Among the many other features that may be used in the electrical control of the shuttle 10 are: a fused circuit for over current, sensing devices to allow for slow zones, sensing devices to prevent override, emergency shutdown systems, independent circuit with emergency cut out and start up buttons, sensor to alert an increase in current if the carriage is inadvertently obstructed, button hold-down to permit movement and shutdown if button released, remote controller to move carriage, shuttle specific programmable remote controller, and LCD displays on the control and indicator panel. Among the information that can be provided on the control and indicator panel for any such electrical control system are: low battery alert, charging light, charged light, ready to start light, error lights which indicate over current, and PE trip light.

In the event of power failure or equipment failure, mechanical override systems can be provided to move the carriage.

Figure 27:
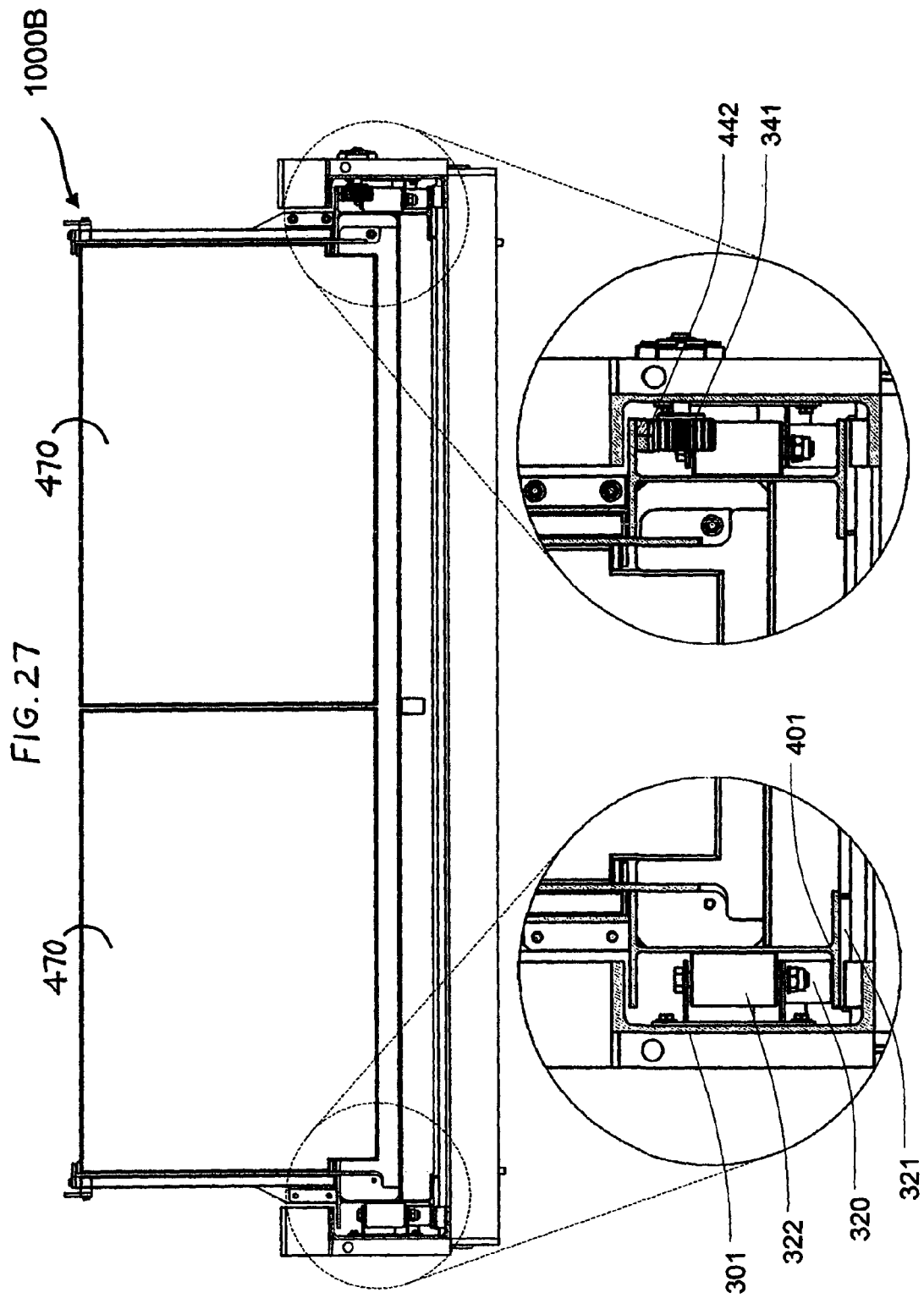
FIG. 27 is a sectional front view through E-E of the shuttle as shown in FIG. 26.
Figure 28:
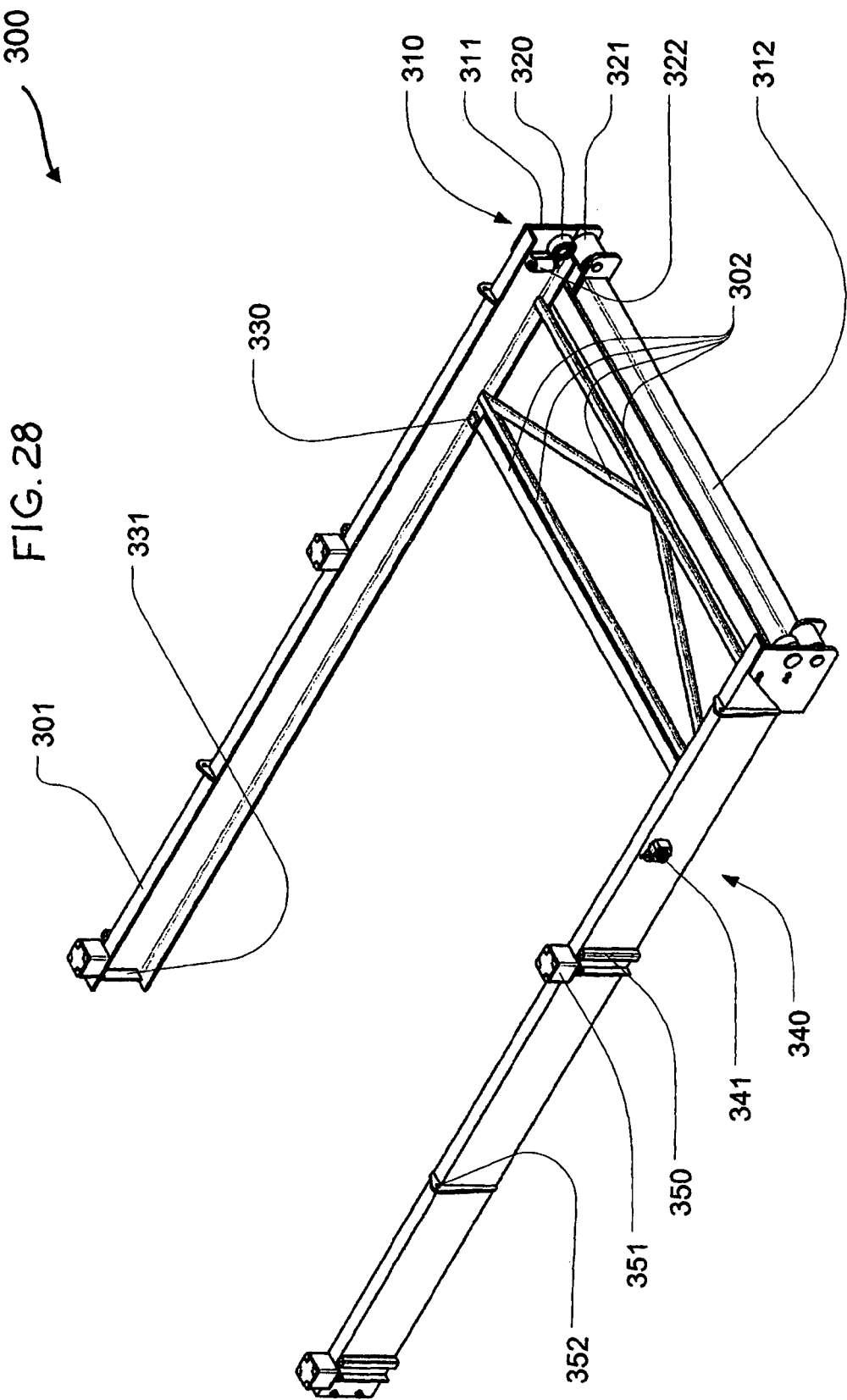
FIG. 28 is a perspective view of the static frame of the shuttle of FIGS. 19 to 27.
Figure 29:
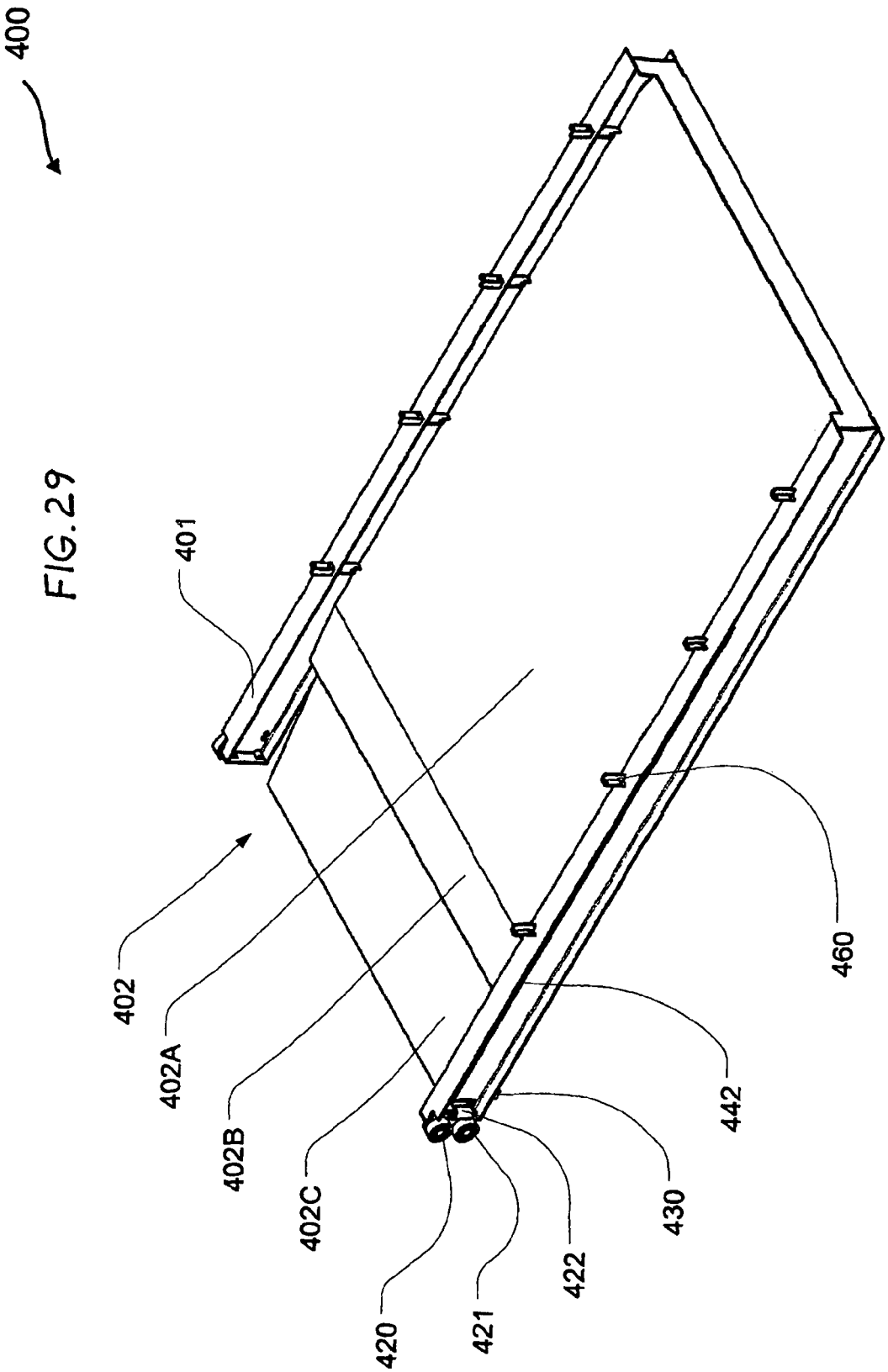
FIG. 29 is a perspective view of the movable carriage of the shuttle of FIGS. 19 to 27.

With reference to the embodiment shown in FIGS. 19 to 23, a load carrying platform shuttle 1000 is shown in an extended configuration 1000A. With reference to FIGS. 24 to 27, the load shuttle 1000 is shown in a retracted configuration 1000B. The load shuttle 1000 has two main components: a frame 300 and a carriage 400. FIG. 28 shows a perspective view of the frame 300. FIG. 29 shows a perspective view of the carriage 400. The carriage 400 is nested within the frame 300 and can telescope to allow the shuttle to move between an extended configuration 1000A and a retracted configuration 1000B.

In use in the context of the construction of a multi-storey building, when the carriage 400 is in its extended position it projects out of the building in an outboard position such that a load can be placed in the carriage 400 by a crane. Moving the carriage 400 into its retracted position inboard of the building allows other crane movements to occur without interference from the carriage 400. The embodiment shown is designed to carry a five tonne load between the extended and retracted positions.

Figure 19:
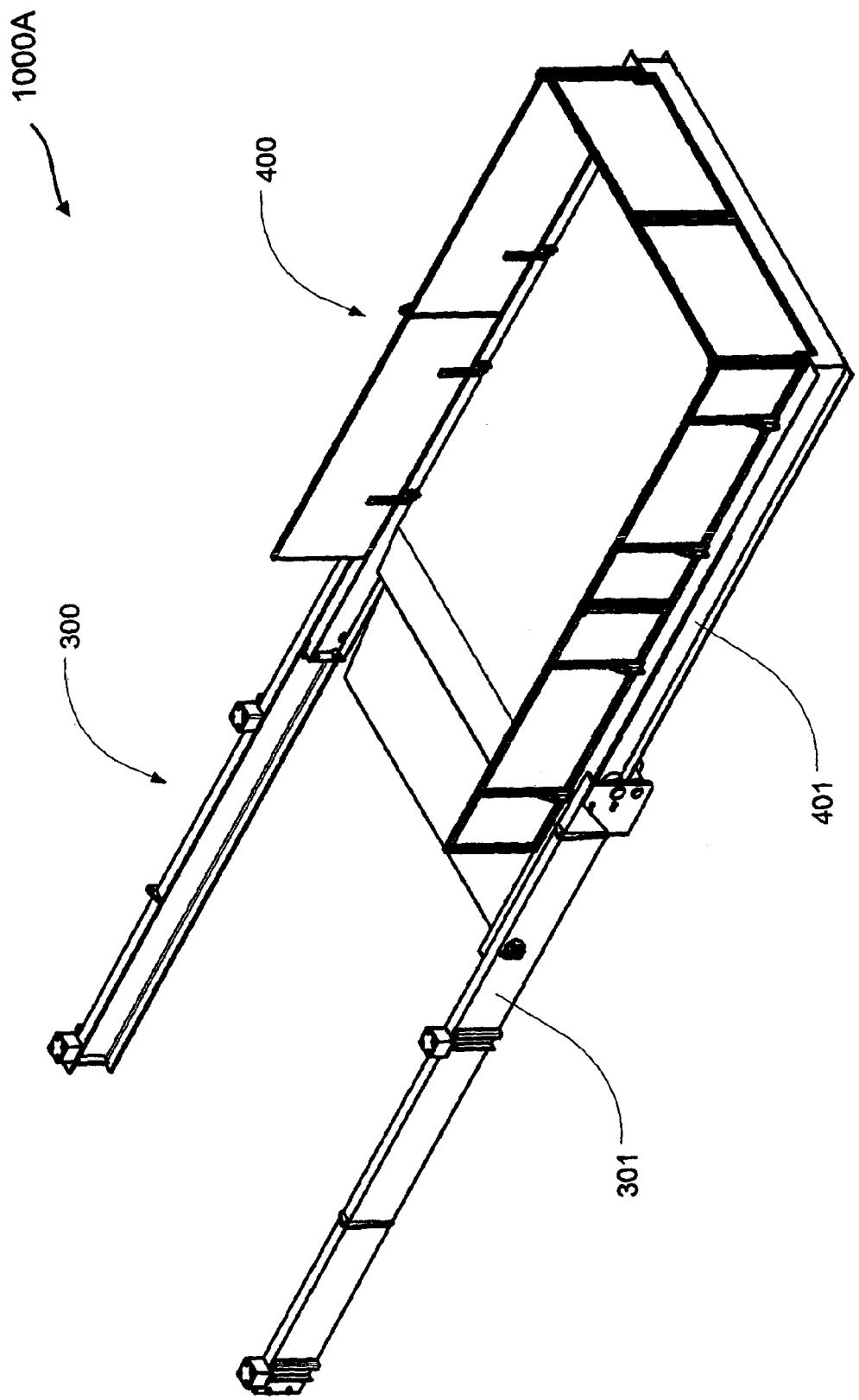
FIG. 19 is a first perspective view of a load carrying platform shuttle according to another embodiment of the invention, with the movable carriage of the shuttle being in the extended position.
Figure 20:
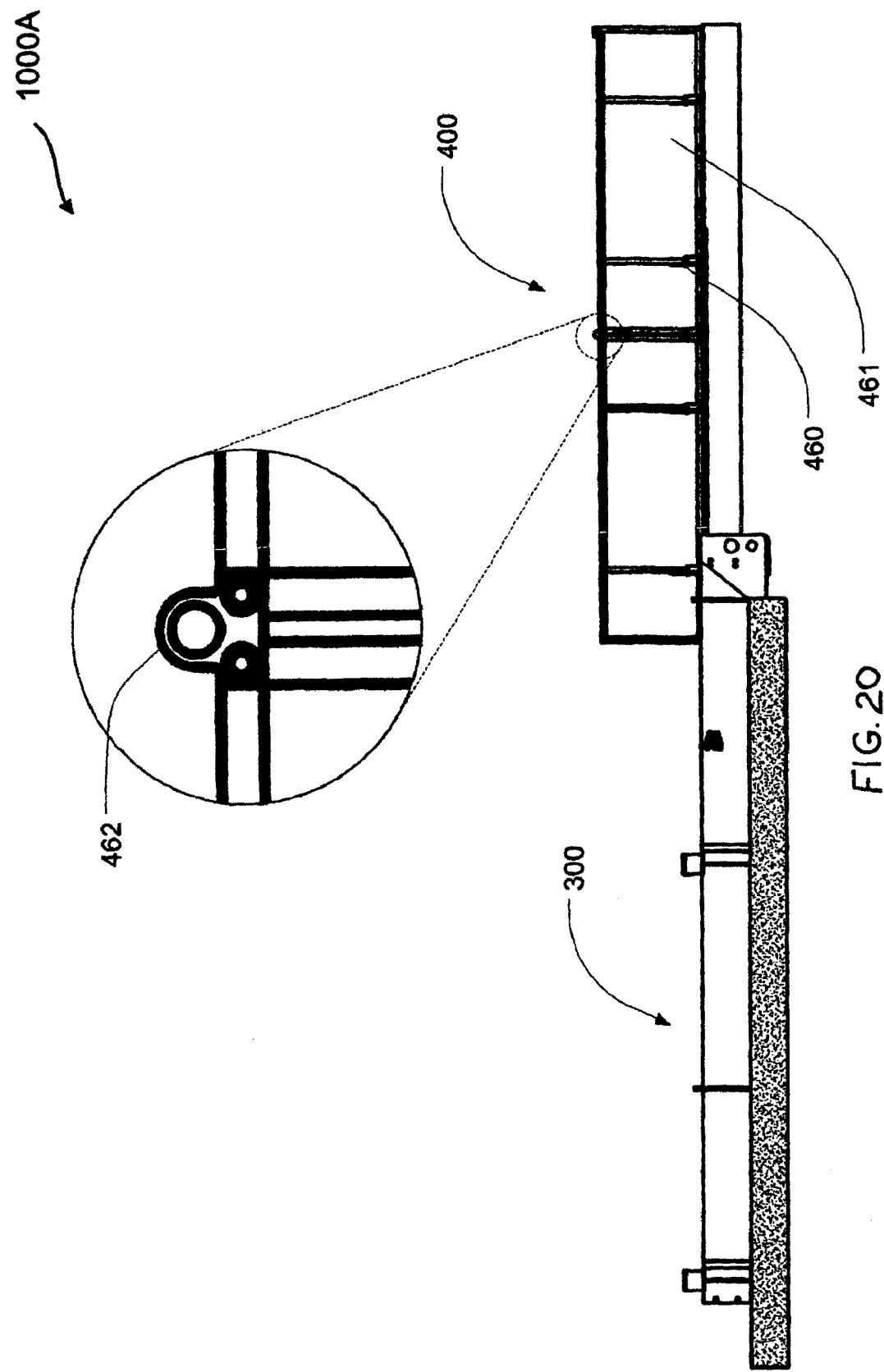
FIG. 20 is a side view of the shuttle as shown in FIG. 19.
Figure 21:
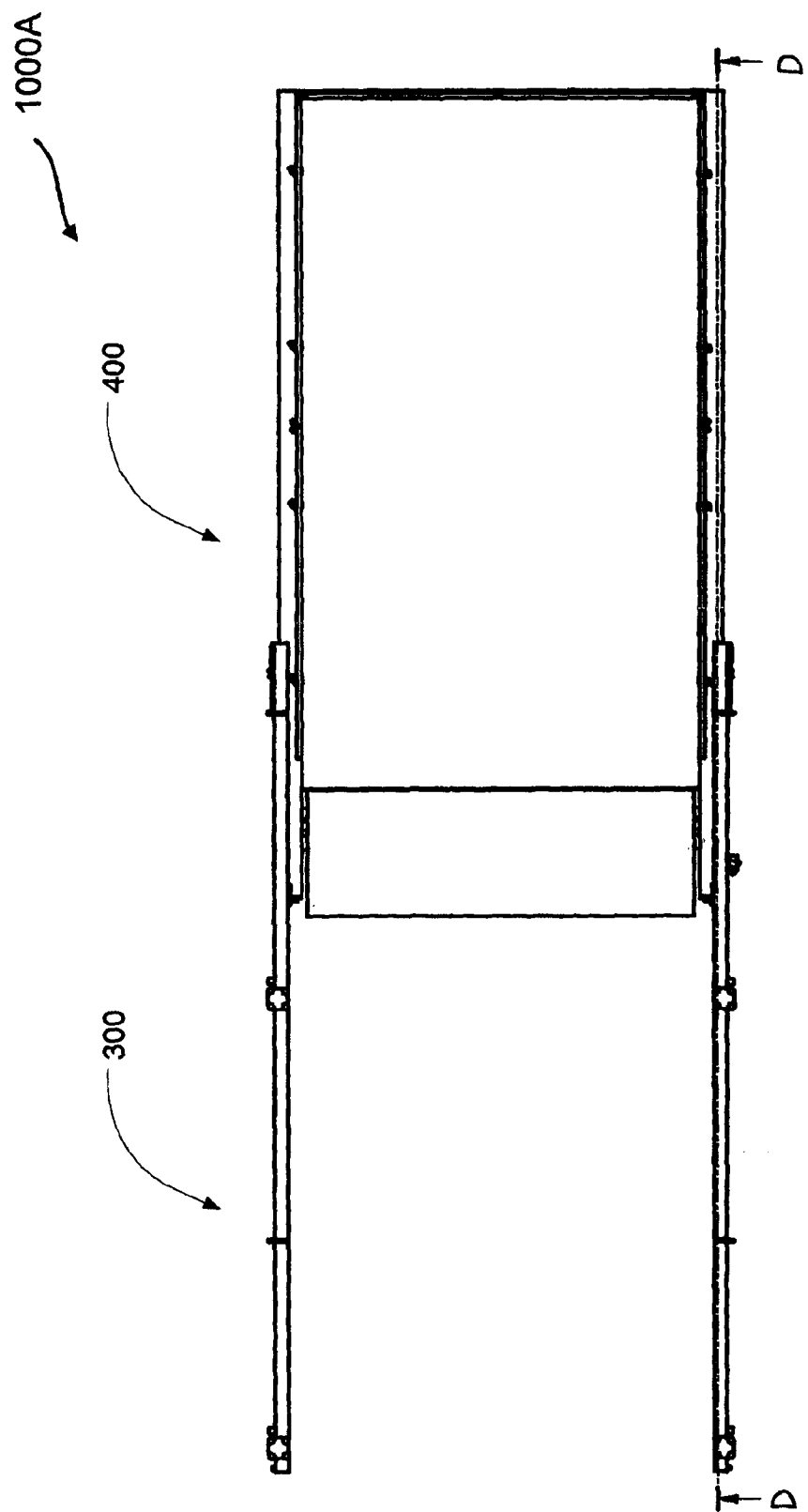
FIG. 21 is a top view of the shuttle as shown in FIG. 19.

With reference to FIG. 19, the load shuttle frame 300 is constructed from a pair of steel side C-channels 301 fixed in parallel arrangement with the flange portions projecting inwards towards each other. Also with reference to FIG. 19, the load shuttle carriage 400 is constructed from a pair of steel side I-beams 401 fixed in parallel arrangement with the flange portions projecting inwards towards each other. When assembled, the outside flange portions of the side I-beams 401 in the carriage 400 nest within the flange portions of the C-channels 301 in the frame 300. This limits the shuttle carriage 400 from tilting out of the shuttle frame 300.

With reference to FIG. 28, the load shuttle frame 300 is constructed from the pair of side C-channels 301 fixed with respect to each other by a set of frame cross braces 302. The frame cross braces 302 are set back from an outboard edge of the shuttle frame 300. At the outboard edge of the frame 300, a frame nose portion 310 includes a nose plate 311 and a nose cross brace 312.

Figure 22:
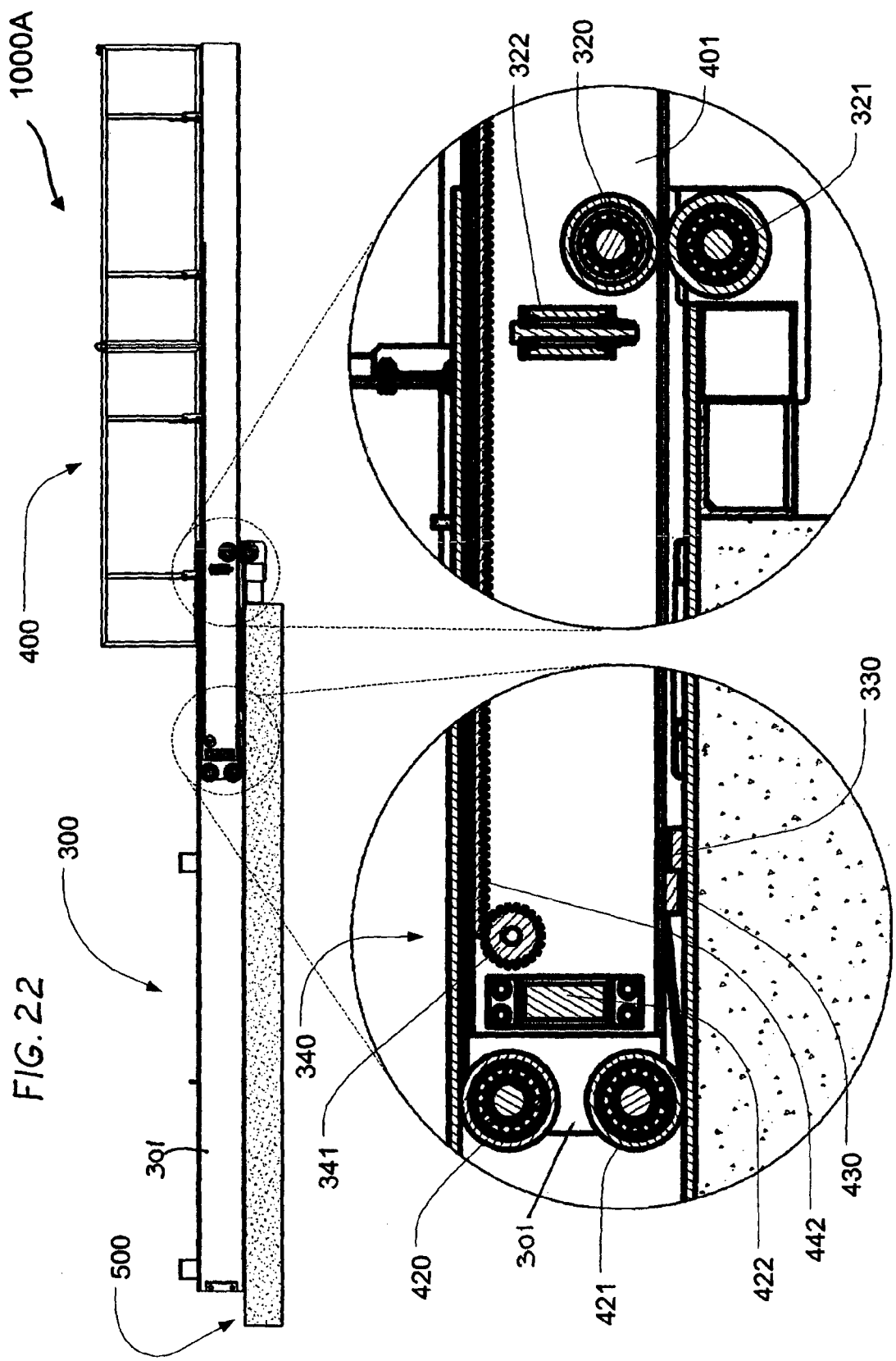
FIG. 22 is a sectional side view through D-D of the shuttle as shown in FIG. 21.

Attached to the nose plate 311 is an upper frame support roller 320 and a lower frame support roller 321. With reference to FIG. 22, the upper frame support roller 320 and the lower frame support roller 321, in use, act as pinch rollers holding the lower horizontal outside flange of the carriage side I-beams 401. The lower frame support roller 321 is larger than the upper support roller 320 as it carries most of the load in the carriage 400. This load is significantly increased when the carriage 400 is in the extended position. The nose cross brace 312 braces the lower frame support roller 321 to increase its load carrying capacity. The upper and lower frame support rollers 320 and 321 limit the vertical movement of the carriage 400 at the outboard edge of the frame 300.

Also attached to the nose plate 311 is a frame guide roller 322 that, together with its opposing frame guide roller 322 on the opposing nose plate 311, act as pinch rollers holding the outer sides of vertical web portions of the carriage side I-beams 401. The opposing frame guide rollers 322 limit the horizontal movement of the carriage 400 at the outboard edge of the frame 300.

With reference to FIG. 29, the load shuttle carriage 400 has a carriage floor area 402 having a horizontal load area 402A and a sloping ramp area 402B transitioning at an outboard edge of the horizontal load area 402A. A floating ramp area 402C is hinged to an outboard edge of the sloping ramp area 402B. In use, an inboard edge of the floating ramp area 402C abuts the surface on which the frame 300 is secured. The sloping ramp area 402B and floating ramp area 402C make is easier to roll or slide loads on and off the horizontal load area 402A.

With reference to FIG. 29, the load shuttle carriage 400 has an upper carriage support roller 420 and a lower carriage support roller 421 positioned at the inboard end of the carriage side beam 401. With reference to FIG. 22, the upper carriage support roller 420 and a lower carriage support roller 421 engage with the lower side of the upper flange and the upper side of the lower flange, respectively, of the frame side channel 301 to limit vertical movement of the inboard end of the carriage.

With reference to FIG. 29, the load shuttle carriage 400 has a carriage guide roller 422 attached to the vertical web of the carriage side beam 401 at the inboard end of the carriage side beam 401 and projecting outwards. The opposing carriage guide rollers 422 on each carriage side beam 401 engage with the vertical web on the frame side channels 301 to limit horizontal movement of the inboard end of the carriage.

Extent of movement between the extended configuration 1000A and the retracted configuration 1000B of the load shuttle is governed by travel stops.

With reference to FIG. 28, the frame 300 has a frame extension travel stop 330 and a frame retraction travel stop 331 on each frame side channel 301. The frame extension travel stop 330 is attached to the upper side of the lower flange of the frame side channel 301 proximate to the outboard side of where the frame cross braces 302 are attached to the side channel 301.

With reference to FIG. 29, the carriage 400 has a carriage extension travel stop 430 on each carriage side beam 401. With reference to FIG. 22, the extent of the carriage 400 telescoping into its extended position outside the frame 300 is limited by the carriage extension travel stop 430 abutting the frame extension travel stop 330. With reference to FIG. 28, the extent of the carriage 400 moving into its retracted position inside the frame 300 is limited by inboard end of the carriage side I-beam 401 abutting the frame retraction travel stop 331.

The movement between the extended configuration 1000A and the retracted configuration 1000B can be driven by means of a hand operated mechanism or an electrical motor. With reference to FIG. 22, in this embodiment the movement is generated by a rack and pinion drive mechanism 340. With reference to FIG. 29 and FIG. 27, the carriage side beam 401 has a rack 442 extending down the length of the lower side of the upper and outer flange. With reference to FIG. 28, FIG. 22 and FIG. 27, the rack is engaged by teeth on the pinion gear 341. The drive mechanism 340 has different gearing depending on the means of operation. The hand operated drive mechanism would have different gearing to the electric drive mechanism.

Figure 23:
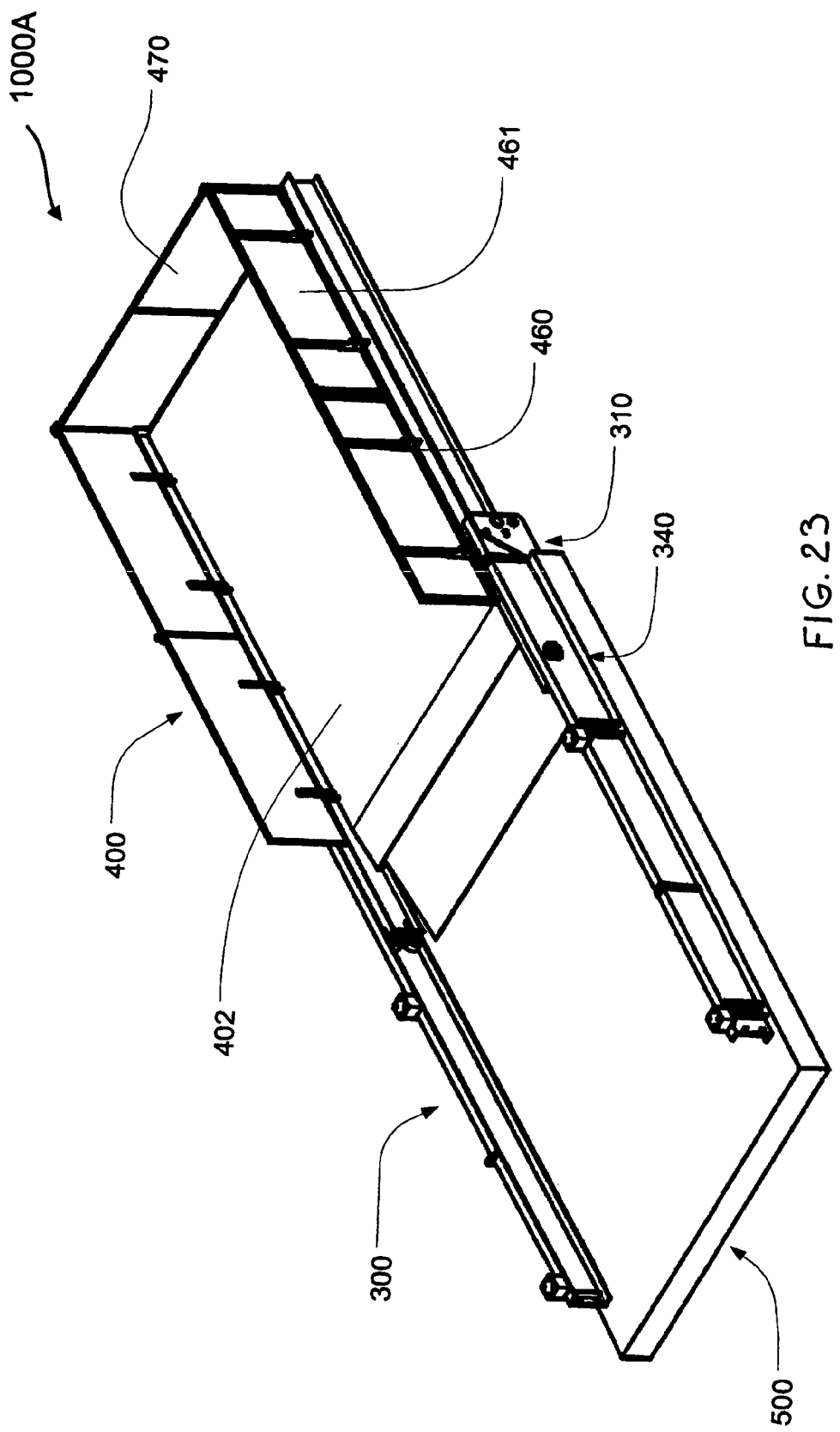
FIG. 23 is a second perspective view of the shuttle of FIGS. 19 to 22.
Figure 24:
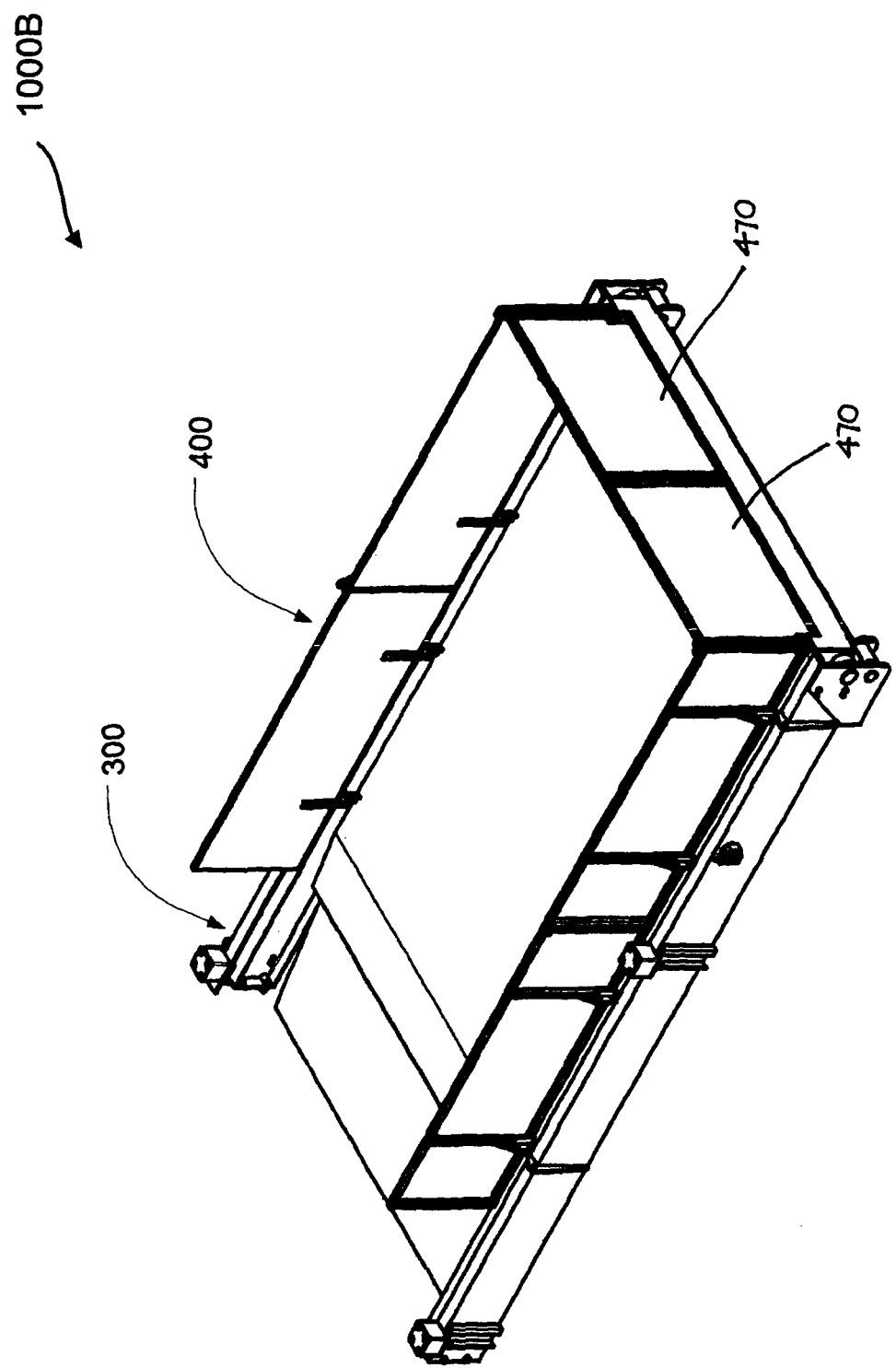
FIG. 24 is a perspective view of the load carrying platform shuttle of FIGS. 19 to 23, with the movable carriage of the shuttle being in the retracted position.
Figure 25:
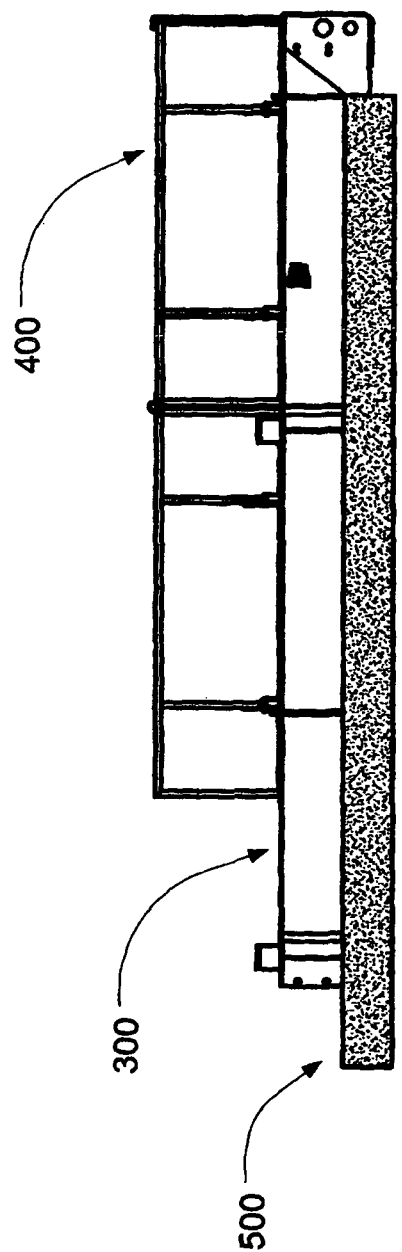
FIG. 25 is a side view of the shuttle as shown in FIG. 24.
Figure 26:
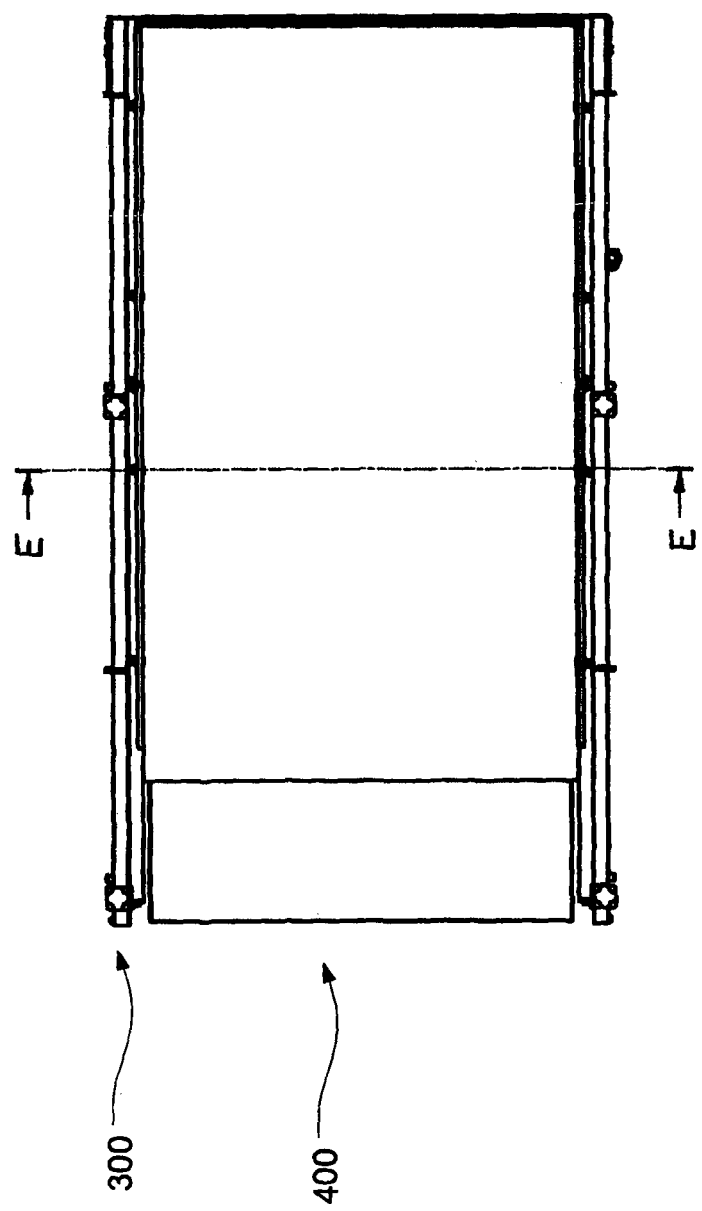
FIG. 26 is a top view of the shuttle as shown in FIG. 24.

With reference to FIG. 23, in the context of the construction of a multi-storey building, the load shuttle is positioned on the surface of an upper side of a floor slab 500 with the nose portion 310 of the frame 300 projecting below the upper side of floor slab 500 and the inboard edge of the nose portion 310 is spaced apart from, and does not abut, an outboard edge of the floor slab 500.

With reference to FIG. 28, the frame 300 is secured to the floor slab 500 in the building using conventional props which extend between the slab of a floor above and the frame stay mounts 351 to brace the frame 300. Alternatively, the frame 300 is secured to the floor slab 500 using concrete ties or other suitable anchors via frame floor mounts 350.

The load shuttle 1000 including the frame 300 and the carriage 400 can be lifted as a unit by a crane using four crane mounts 352 on the frame 300.

With reference to FIG. 23, the carriage 400 has eight guard rail brackets 460 attached to the carriage side beams 401 that support guard rails 461 that project perpendicularly from the carriage floor plate 402. The guard rails 461 extend down the length of each carriage side beam 401 from the outboard facing end of the carriage side beam 401 for the length of the horizontal load area 402A and the sloping ramp area 402B on the floor plate 402.

The guard rails 461 down each side are a pair of steel panels that are interconnected on their top edge with a bracket which also functions as a harness attachment point 462. This harness attachment point 462 provides a point to attach a safety harness that allows movement around the full area of the carriage floor plate 402.

The guard rails 461 support guard gates 470 that project perpendicularly from the carriage floor plate 402 and extend across the outboard edge of the carriage floor plate 402 between each of the guard rails 461. The guard gates 470 pivot between a closed and open position where they connect to the guard rails 461. The guard gates 470 prevent loads or people accidentally falling from the carriage 400.

It will be readily appreciated that an advantage of the load carrying platform shuttle of the present invention, when used in the construction of a multi-storey building, for example, is that its carriage can move to the inboard position while carrying a crane load, and this allows the number of crane movements to be increased for a given time period. Other prior art work platforms require the load to be removed from the movable platform before the platform can be safely moved to the inboard position. With such prior art work platforms, while the load is being removed from the movable platform and the movable platform is in the outboard position, other crane movements are restricted.

It is another advantage that the load carrying capacity of the shuttle of the present invention, when the movable carriage is moving from its extended position to its retracted position, is 6 tonnes, which is a considerable improvement over the prior art. This is largely due to the strength of the bulk head 34 of the frame which houses the major load carrying components, and particularly the pair of "fully flanged" rollers 44 (or load bearing tyres).

Although the present invention has been described with reference to particular embodiments, it will be appreciated by those skilled in the art that the invention may be embodied in many other forms. For example, the drive mechanism could be a hydraulic piston arrangement.

The invention claimed is:

1. A load carrying platform shuttle comprising a static frame securable to at least one slab and a carriage arranged to telescope into the static frame between an extended position outboard of the at least one slab and a retracted position inboard of the at least one slab, wherein the carriage can move between the extended position and the retracted position while carrying a load and wherein the static frame is configured to be secured to the at least one slab so as to support the load carrying platform shuttle during movement of the carriage between the extended position and the retracted position whilst carrying a load, wherein frame stay mounts are disposed on the static frame, the frame stay mounts being configured for connection to props extending between the frame stay mounts and a slab of a floor level above, and wherein the shuttle includes a pair of load bearing, lower support rollers connected to an outboard end of the frame, each lower support roller supporting the carriage at respective opposite sides thereof, wherein each lower support roller supports an underside of a flange of a side beam forming a respective side of the carriage and wherein the side beam is an I-beam which has a lower flange and an upper flange interconnected by a vertical web portion, and the lower support roller supports the underside of the lower flange and wherein the lower support roller is in alignment with the vertical web portion, wherein each lower support roller supports substantially a full width of said underside and wherein the shuttle includes a pair of upper support rollers connected to an outboard end of the frame, each upper support roller cooperating with a respective lower support roller to pinch and hold therebetween the lower flange of the side beam, and wherein movement of the carriage between the extended position and the retracted position is driven by means of a motor.

2. The shuttle of claim 1, wherein the motor acts upon a gear assembly.

3. The shuttle of claim 1, wherein the shuttle includes a pair of guide rollers connected to an outboard end of the frame, each guide roller engaging against an outer facing side of the vertical web portion of an I-beam of the carriage at respective opposite sides thereof.

4. The shuttle of claim 1, wherein the load carrying capacity of the shuttle, when the movable carriage is moving between the extended position and the retracted position, is at least 5 tonnes.

5. The shuttle of claim 2 wherein the gear assembly is disposed upon one side of the carriage.

6. A load carrying platform shuttle comprising a static frame securable to at least one slab and a carriage arranged to telescope into the static frame between an extended position outboard of the at least one slab and a retracted position inboard of the at least one slab, wherein the carriage can move between the extended position and the retracted position while carrying a load and wherein the static frame is configured to be secured to the at least one slab so as to support the load carrying platform shuttle during movement of the carriage between the extended position and the retracted position whilst carrying a load, wherein frame floor mounts are disposed on the static frame, the frame floor mounts being configured to receive anchors so as to secure the static frame to the at least one slab, and wherein the shuttle includes a pair of load bearing, lower support rollers connected to an outboard end of the frame, each lower support roller supporting the carriage at respective opposite sides thereof, wherein each lower support roller supports an underside of a flange of a side beam forming a respective side of the carriage and wherein the side beam is an I-beam which has a lower flange and an upper flange interconnected by a vertical web portion, and the lower support roller supports the underside of the lower flange and wherein the lower support roller is in alignment with the vertical web portion, wherein each lower support roller supports substantially a full width of said underside and wherein the shuttle includes a pair of upper support rollers connected to an outboard end of the frame, each upper support roller cooperating with a respective lower support roller to pinch and hold therebetween the lower flange of the side beam, and wherein movement of the carriage between the extended position and the retracted position is driven by means of a motor.

7. The shuttle of claim 6, wherein the motor acts upon a gear assembly.

8. The shuttle of claim 6, wherein the shuttle includes a pair of guide rollers connected to an outboard end of the frame, each guide roller engaging against an outer facing side of the vertical web portion of an I-beam of the carriage at respective opposite sides thereof.

9. The shuttle of claim 6, wherein the load carrying capacity of the shuttle, when the movable carriage is moving between the extended position and the retracted position, is at least 5 tonnes.

10. The shuttle of claim 7 wherein the gear assembly is disposed upon one side of the carriage.

* * * * *